United States Patent
Vanam et al.

(10) Patent No.: US 12,348,787 B2
(45) Date of Patent: Jul. 1, 2025

(54) METHODS FOR SIMPLIFYING ADAPTIVE LOOP FILTER IN VIDEO CODING

(71) Applicant: InterDigital VC Holdings, Inc., Wilmington, DE (US)

(72) Inventors: Rahul Vanam, San Diego, CA (US); Yuwen He, San Diego, CA (US); Yan Ye, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/140,806

(22) Filed: Apr. 28, 2023

(65) Prior Publication Data
US 2023/0388553 A1 Nov. 30, 2023

Related U.S. Application Data

(63) Continuation of application No. 16/760,974, filed as application No. PCT/US2018/058360 on Oct. 31, 2018, now Pat. No. 11,641,488.
(Continued)

(51) Int. Cl.
*H04N 19/147* (2014.01)
*G06F 18/211* (2023.01)
(Continued)

(52) U.S. Cl.
CPC ........... *H04N 19/82* (2014.11); *G06F 18/211* (2023.01); *G06F 18/241* (2023.01);
(Continued)

(58) Field of Classification Search
CPC .... H04N 19/82; H04N 19/105; H04N 19/117; H04N 19/176; H04N 19/147; G06F 18/211; G06F 18/2431; G06F 18/241
See application file for complete search history.

(56) References Cited

U.S. PATENT DOCUMENTS

| | | |
|---|---|---|
| 9,998,737 B2 | 6/2018 | Fu et al. |
| 10,382,766 B2 | 8/2019 | Karczewicz et al. |

(Continued)

FOREIGN PATENT DOCUMENTS

| | | |
|---|---|---|
| CN | 102804776 A | 11/2012 |
| EP | 3471413 A1 | 4/2019 |

(Continued)

OTHER PUBLICATIONS (P. Lai and F. C. A. Fernandes, "Computationally efficient adaptive loop filtering design with directional features for video coding," 2012 IEEE International Conference on Acoustics, Speech and Signal Processing (ICASSP), Kyoto, Japan, 2012, pp. 1225-1228, doi: 10.1109/ICASSP.2012.6288109) (Year: 2012).*
(Continued)

*Primary Examiner* — Patrick E Demosky
(74) *Attorney, Agent, or Firm* — Xiaoan Lu

(57) ABSTRACT

Systems, methods and instrumentalities are disclosed for adaptively selecting an adaptive loop filter (ALF) procedure for a frame based on which temporal layer the frame is in. ALF procedures may vary in computational complexity. One or more frames including the current frame may be in a temporal layer of a coding scheme. The decoder may determine the current frame's temporal layer level within the coding scheme. The decoder may select an ALF procedure based on the current frame's temporal layer level. If the current frame's temporal layer level is higher within the coding scheme than some other temporal layer levels, an ALF procedure that is less computationally complex may be selected for the current frame. Then the decoder may perform the selected ALF procedure on the current frame.

16 Claims, 17 Drawing Sheets

Related U.S. Application Data

(60) Provisional application No. 62/607,033, filed on Dec. 18, 2017, provisional application No. 62/579,977, filed on Nov. 1, 2017.

(51) Int. Cl.
<table>
<tr><td>G06F 18/241</td><td>(2023.01)</td></tr>
<tr><td>G06F 18/2431</td><td>(2023.01)</td></tr>
<tr><td>H04N 19/105</td><td>(2014.01)</td></tr>
<tr><td>H04N 19/117</td><td>(2014.01)</td></tr>
<tr><td>H04N 19/176</td><td>(2014.01)</td></tr>
<tr><td>H04N 19/82</td><td>(2014.01)</td></tr>
</table>

(52) U.S. Cl.
CPC ....... *G06F 18/2431* (2023.01); *H04N 19/105* (2014.11); *H04N 19/117* (2014.11); *H04N 19/176* (2014.11)

(56) References Cited

U.S. PATENT DOCUMENTS

<table>
<tr><td>10,848,760 B2</td><td>11/2020</td><td>Drugeon et al.</td></tr>
<tr><td>11,290,715 B2</td><td>3/2022</td><td>Lim et al.</td></tr>
<tr><td>2012/0039389 A1</td><td>2/2012</td><td>Sjöberg et al.</td></tr>
<tr><td>2012/0183078 A1</td><td>7/2012</td><td>Lai et al.</td></tr>
<tr><td>2015/0117555 A1</td><td>4/2015</td><td>Chong et al.</td></tr>
<tr><td>2015/0264406 A1</td><td>9/2015</td><td>Kim et al.</td></tr>
<tr><td>2017/0332075 A1</td><td>11/2017</td><td>Karczewicz et al.</td></tr>
<tr><td>2018/0041779 A1</td><td>2/2018</td><td>Zhang et al.</td></tr>
<tr><td>2018/0077414 A1</td><td>3/2018</td><td>Reddy et al.</td></tr>
<tr><td>2018/0192050 A1</td><td>7/2018</td><td>Zhang et al.</td></tr>
<tr><td>2019/0014315 A1*</td><td>1/2019</td><td>Karczewicz ........... H04N 19/14</td></tr>
<tr><td>2020/0145651 A1</td><td>5/2020</td><td>Abe et al.</td></tr>
<tr><td>2020/0236355 A1</td><td>7/2020</td><td>Zhao et al.</td></tr>
<tr><td>2020/0304827 A1</td><td>9/2020</td><td>Abe et al.</td></tr>
<tr><td>2021/0218962 A1</td><td>7/2021</td><td>Lim et al.</td></tr>
<tr><td>2021/0314565 A1</td><td>10/2021</td><td>Ohkawa et al.</td></tr>
</table>

FOREIGN PATENT DOCUMENTS

<table>
<tr><td>JP</td><td>2014-511615 A</td><td>5/2014</td></tr>
<tr><td>JP</td><td>7036628 B2</td><td>3/2022</td></tr>
<tr><td>KR</td><td>10-2013- 0053645 A</td><td>5/2013</td></tr>
<tr><td>WO</td><td>2016/130801 A1</td><td>8/2016</td></tr>
<tr><td>WO</td><td>2017/123487 A1</td><td>7/2017</td></tr>
<tr><td>WO</td><td>2017/201011 A1</td><td>11/2017</td></tr>
<tr><td>WO</td><td>2019/010217 A1</td><td>1/2019</td></tr>
</table>

OTHER PUBLICATIONS (Li, Xiang, Yongjo Ahn, and Donggyu Sim. "Complexity Reduction of an Adaptive Loop Filter Based on Locall Homogeneity." IEIE Transactions on Smart Processing and Computing 6.2 (2017): 93-101) (hereinafter Li) (Year: 2017).*
(M. Karczewicz, L. Zhang, W. Chien and X. Li, "Geometry transformation-based adaptive in-loop filter," 2016 Picture Coding Symposium (PCS). Nuremberg, 2016, pp. 1-5, doi: 10.1109/PCS.2016. 7906346) (Year: 2016).*
"JEM-7.0 Reference Software", Available at <https://jvet.hhi.fraunhofer.de/svn/svn_HMJEMSoftware/tags/HM-16.6-JEM-7.0>, 1 page.
An et al., "Unified Adaptive Loop Filter for Luma and Chroma", JVET-G0095, HiSilicon Technologies Co., Ltd., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-10.
Boyce et al., "Draft High Efficiency Video Coding (HEVC) Version 2, Combined Format Range Extensions (RExt), Scalability (SHVC), and Multi-View (MV-HEVC) Extensions", JCTVC-R1013_V1, Editors, Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, 382 pages.
Chen et al., "Algorithm Description of Joint Exploration Test Model 7 (JEM 7)", Editors, JVET-G1001-V1, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.
Chen et al., "Further Improvements to HMKTA-1.0", VCEG-AZ07, Qualcomm Incorporated, ITU—Telecommunications Standardization Sector, Study Group 16 Question 6, Video Coding Experts Group (VCEG), 52nd Meeting, Warsaw, Poland, Jun. 19-26, 2015, 8 pages.
Hellman, Tim, "ALF Complexity Analysis", JCTVC-F342_r2, Torino, Italy, Jul. 2011.
ISO/IEC, "Information Technology-Coding of Moving Pictures and Associated Audio for Digital Storage Media at up to About 1,5 Mbit/s-Part 2: Video", ISO/IEC 11172-2:1993/Cor.3:2003(E), Nov. 2003, 6 pages.
ISO/IEC, "Information Technology-Generic Coding of Moving Pictures and Associated Audio Information: Video", ISO/IEC 13818-2:2000(E), Dec. 15, 2000, 220 pages.
ITU, "Codec For Audiovisual Services AT n*384 kbits", Series H: Audiovisual And Multimedia Systems, Coding of Moving Video, International Telecommunication Union, ITU-T Rec H.261, Nov. 1988, 14 pages.
ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.
ITU-T, "Video Coding for Low Bit Rate Communication", ITU-T Recommendation H.263, Transmission of Non-Telephone Signals, Mar. 1996, 52 pages.
Karczewicz, Marta et al., "Geometry Transformation-based Adaptive In-Loop Filter", IEEE; 2016 Picture Coding Symposium (PCS), Dec. 7, 2016, 5 pages.
Kim et al., "Fast Intra Mode Decision Algorithm Using Sub-Sampled Pixels", IEEE 15th International Symposium on Consumer Electronics, 2011, pp. 290-293.
Lai et al., "Adaptive Loop Filter with Directional Features and Similarity Mapping for Video Coding", Visual Information Processing and Communication III, vol. 8305, Feb. 2012, pp. 34-41.
Lai et al., "CE8 Subtest 1: Block-Based Filter Adaptation with Features on Subset of Pixels", JCTVC-F301, Samsung Electronics Co., Ltd., Joint Collaborative Team on Video Coding (JCT-VC) of ITU-T SG16 WP3 and ISO/IEC JTC1/SC29/WG11, 6th Meeting: Torino, Italy, Jul. 14-22, 2011, pp. 1-4.
Lai et al., "Loop Filtering with Directional Features", JCTVC-E288, Samsung Electronics Co., Ltd., Joint Collaborative Team on Video Coding (JCT-VC) of ITU-T SG 16 WP 3 and ISO/IEC JTC 1/SC 29/WG 11, 5th Meeting: Geneva, CH, Mar. 16-23, 2011, pp. 1-2.
Li et al., "Complexity Reduction of an Adaptive Loop Filter Based on Local Homogeneity", IEIE Transactions on Smart Processing and Computing, vol. 6, No. 2, Apr. 2017, pp. 93-101.
Lim, Sung-Chang et al., "Subsampled Sum-Modified-Laplacian for Adaptive Loop Filter in Versatile Video Coding", 2020, 176330-176342.
McCann et al., "High Efficiency Video Coding (HEVC) Test Model 16 (HM 16) Improved Encoder Description", JCTVC-S1002, Editors, Joint Collaborative Team on Video Coding (JCT-VC) of ITU-T SG16 WP3 and ISO/IEC JTC1/SC29/WG11, 19th Meeting: Strasbourg, FR, Oct. 17-24, 2014, 54 pages.
Miyazawa et al., "Complexity Reduction of In-Loop Filtering for Compressed Image Restoration in HEVC", Picture Coding Symposium, May 7-9, 2012, pp. 413-416.
Miyazawa et al., "Reduction of the Number of Pixels Used in Adaptive Loop Filter", JCTVC-G 446, Mitsubishi Electric Corporation, Joint Collaborative Team on Video Coding (JCT-VC) of ITU-T SG WP 3 and ISO/IEC JTC 1/SC 29/WG 11, 7th Meeting: Geneva, CH, Nov. 21-30, 2011, pp. 1-4.
Polin, Lai et al., "Computationally efficient adaptive loop filtering design with directional features for video coding", 2012 IEEE International Conference on Acoustics, Speech and Signal Processing (ICASSP), Kyoto, Japan, Mar. 30, 2012, pp. 1225-1228.
Vanam et al., "CE2: Subsampled Gradient Calculation for Highest Temporal Layer (Test 2.7.1)", JVET-L0240, InterDigital Commu-

(56) References Cited

OTHER PUBLICATIONS nications, Inc., Joint Video Experts (JVET) of ITU-T SG 16 WP 3 and ISO/IEC JTC 1/SC 29/WG 11, 12th Meeting: Macao, CN, Oct. 3-12, 2018, pp. 1-3.

Xiu et al., "Description of SDR, HDR and 360° Video Coding Technology Proposal by InterDigital Communications and Dolby Laboratories", JVET-J0015-V1, InterDigital Communications, Inc., Dolby Laboratories, Inc., Joint Video Experts Team (JVET) of ITU-T SG 16 WP 3 and ISO/IEC JTC1/SC 29/WG 11, 10th Meeting: San Diego, US, Apr. 10-20, 2018, 82 pages.

Zheng et al., "Directional adaptive loop filter for video coding," 18th IEEE International Conference on Image Processing, 2011, pp. 3501-3504.

Karczewicz et al., "Improvements on adaptive loop filter", Document: JVET-B0060, Joint Video Exploration Team (JVET) of ITU-T SG 16 WP 3 and ISO/IEC JTC 1/SC 29/WG 11, 2nd Meeting: San Diego, USA, Feb. 20-26, 2016, 5 pages.

\* cited by examiner horizontal and vertical subsampling

METHODS FOR SIMPLIFYING ADAPTIVE LOOP FILTER IN VIDEO CODING

CROSS-REFERENCE TO RELATED APPLICATIONS

This application is a Continuation Application of U.S. Non-Provisional application Ser. No. 16/760,974 filed May 1, 2020; which is the National Stage Entry under 35 U.S.C. § 371 of Patent Cooperation Treaty Application No. PCT/US2018/058360, filed Oct. 31, 2018, which claims the benefit of U.S. Provisional Patent Application No. 62/579,977, filed Nov. 1, 2017, U.S. Provisional Patent Application No. 62/607,033, filed Dec. 18, 2017, the contents of which are incorporated by reference.

BACKGROUND

Video coding systems are widely used to compress digital video signals to reduce the storage need and/or transmission bandwidth of such signals. Among the various types of video coding systems, such as block-based, wavelet-based, and object-based systems, block-based hybrid video coding systems may be the most widely used and deployed Examples of block-based video coding systems include international video coding standards such as the H.261, MPEG-1, MPEG-2, H.263, H.264/AVC, and H.265/HEVC.

SUMMARY

Systems, methods and instrumentalities are disclosed for adaptively selecting an adaptive loop filter (ALF) procedure for a frame based on which temporal layer the frame is in. ALF procedures may vary in computational complexity.

A decoder may receive an indication of whether ALF is enabled. The decoder may apply ALF to a current frame based on the indication that the ALF is enabled. The current frame may be in a temporal layer of a coding scheme. The coding scheme may include multiple temporal layers that range from a low temporal level to a high temporal level. The decoder may determine the current frame's temporal layer level within the coding scheme.

The decoder may select an ALF procedure based on the current frame's temporal layer level. If the current frame's temporal layer level is higher within the coding scheme than some other temporal layer levels, a first ALF procedure that is less computationally complex than the second ALF procedure may be selected for the current frame. If the temporal layer level is the lowest within the coding scheme, the second ALF procedure may be selected for the current frame. Then the decoder may perform the selected ALF procedure on the current frame.

The current frame may include a current block that has multiple pixels. The ALF procedure that is less computationally complex may classify the block based on a subset of pixels. If the temporal layer level of the current frame is the highest within the coding scheme, the subset of pixels may be selected from the pixels in the current block. One or more gradients may be calculated for the current block using the selected subset of pixels, and the current block may be classified for ALF based on the calculated gradients. The subset of pixels may be selected from the pixels in the current block by skipping at least one pixel in the current block.

For example, the subset of pixels may be selected from the pixels in the current block by skipping at least one pixel in a vertical direction and/or at least one pixel in a horizontal direction. If the temporal layer level of the current frame is highest within the coding scheme, the subset of pixels may be selected from the pixels in the current block by skipping one or more pixels in a vertical direction and one or more pixels in a horizontal direction. If the temporal layer level of the current frame is higher than the lowest level and lower than the highest level within the coding scheme, the subset of pixels may be selected from the pixels in the current block by skipping one or more pixels in a vertical direction, by skipping one or more pixels in a horizontal direction, or by skipping one or more pixels in a diagonal direction.

An ALF procedure may include block classification based on each pixel of the current block. The ALF procedure may be more computationally complex than the ALF procedure that includes block classification based on a subset of pixels. The gradients may be calculated for the current block using each pixel in the current block, and the current block may be classified for ALF based on the calculated gradients.

The decoder may receive an indication that the subset of pixels is to be selected for calculating the gradients and/or an indication of how the subset of pixels is to be selected.

An ALF procedure that is less computationally complex may include block classification based on fewer gradients calculations than block classification based on each pixel in a block. For example, the ALF procedure may include block classification based on gradient calculation for a subset of pixels (e.g., based on calculation of a smaller number of gradients than the calculation of gradients for all pixels). If the current frame's temporal layer level is higher within the coding scheme, calculation of a gradient in at least one of vertical, horizontal, or diagonal directions of the pixels of the current block may be skipped. If the current frame's temporal layer level is the lowest within the coding scheme, gradients in each of vertical, horizontal, or diagonal directions of the pixels of the current block may be calculated.

An ALF procedure that is less computationally complex may include selectively skipping block classification. If the current frame's temporal layer level is higher within the coding scheme than some temporal layer levels, block classification may be skipped for the current frame. If the current frame's temporal layer level is the lowest within the coding scheme, block classification may be performed for the current frame.

An ALF procedure that is less computationally complex may conditionally skip ALF filtering. One or more gradients may be calculated for the current block of the current frame using the pixels of the current block. A sum of the gradients may be determined for the current block, and then compared with a threshold to determine whether to disable ALF for the current block. If the sum of the plurality of gradients is less than the threshold, ALF may be disabled for the current block, and the current block may be reconstructed with the ALF disabled.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
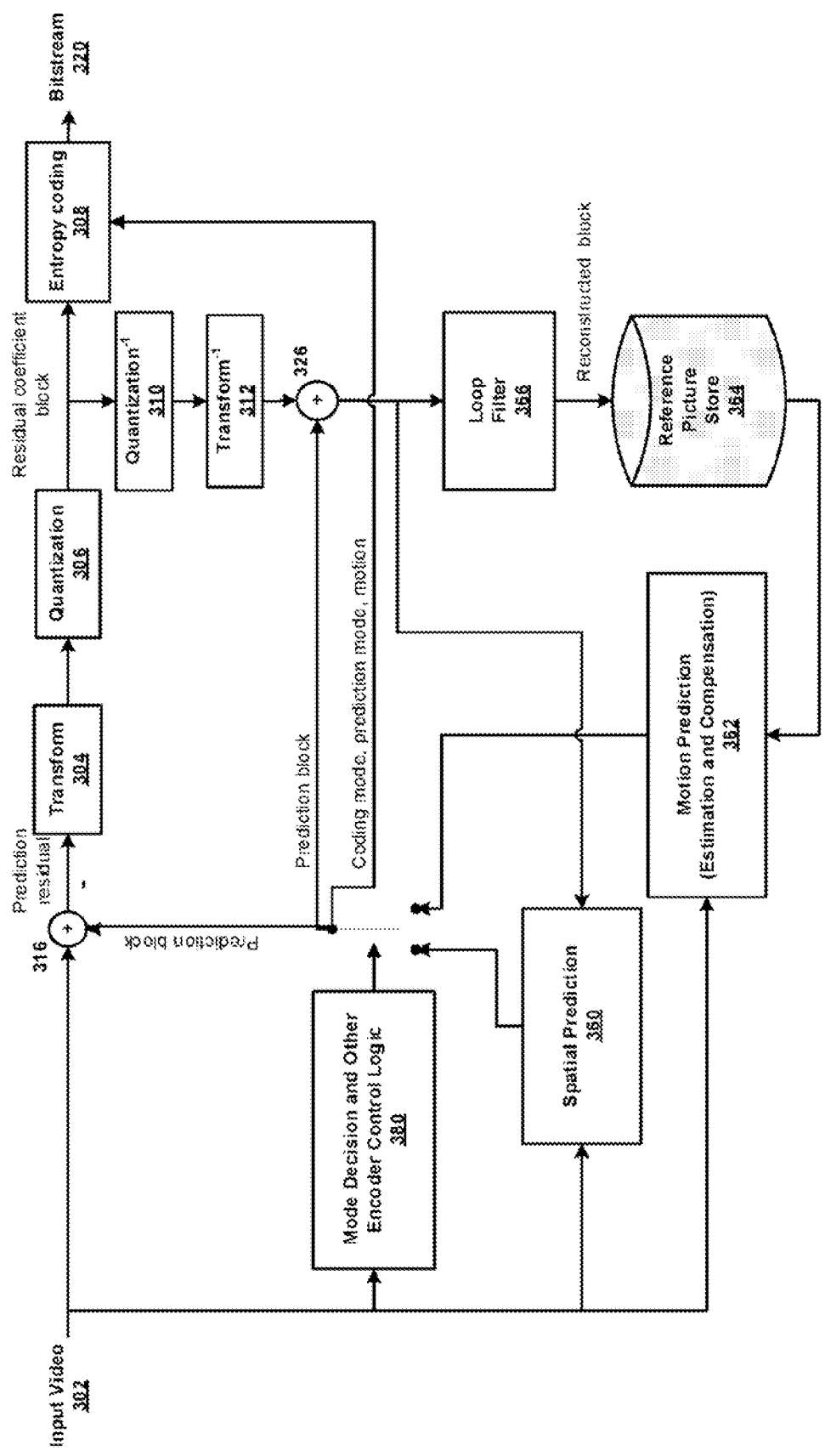
FIG. 1 is an example block diagram of a block-based hybrid video encoder.

FIG. 1 shows an example of a block-based hybrid video encoding system. Input video signal 302 may be processed block by block. Extended block sizes (e.g., a coding unit (CU)) may be used (e.g., in HEVC), for example, to efficiently compress high resolution (e.g., 1080p and beyond) video signals. A CU may be, for example, 64×64 pixels. A CU may be partitioned (e.g., into prediction units (PU)). Separate (e.g., the same or different) prediction procedures may be applied to PUs. Spatial prediction 360 and/or temporal prediction 362 may be performed, for example, for an (e.g., each) input video block (e.g., macroblock (MB) or CU)).

Spatial prediction (e.g., intra prediction) may predict a current video block, for example, by using pixels from samples of already coded neighboring blocks (e.g., reference samples) in a (e.g., the same) video picture/slice. Spatial prediction may reduce spatial redundancy that may be inherent in a video signal. Temporal prediction (e.g., inter prediction or motion compensated prediction) may predict a current video block, for example, by using reconstructed pixels from already coded video pictures. Temporal prediction may reduce temporal redundancy that may be inherent in a video signal. A temporal prediction signal for a given video block may be signaled, for example, by one or more motion vectors (MVs), which may indicate an amount and direction of motion between a current block and a reference block. A reference picture index (e.g., for each video block) may be sent, for example, when multiple reference pictures may be supported (e.g., for H.264/AVC or HEVC). A reference index may be used to identify a reference picture (e.g., in reference picture store 364) that a temporal prediction signal comes from.

Mode decision block 380 in an encoder may (e.g., after spatial and/or temporal prediction) choose a (e.g., the best) prediction mode based on, for example, a rate-distortion optimization procedure. A prediction block may be subtracted from a current video block 316. A prediction residual may be de-correlated (e.g., using transform 304) and quantized 306. Quantized residual coefficients may be inverse quantized 310 and inverse transformed 312, e.g., to form a reconstructed residual. A reconstructed residual may be added back to prediction block 326, for example, to form a reconstructed video block. In-loop filtering 366 (e.g., de-blocking filter and/or Adaptive Loop Filters) may be applied to a reconstructed video block, for example, before it is put in reference picture store 364 and used to code future video blocks. Entropy coding unit 308 may for output video bit-stream 320, for example, by compressing and packing coding mode (e.g., inter or intra), prediction mode information, motion information and/or quantized residual coefficients. The encoder may include a WTRU (e.g., as described herein), a processor of a WTRU, and/or the like.

Figure 2:
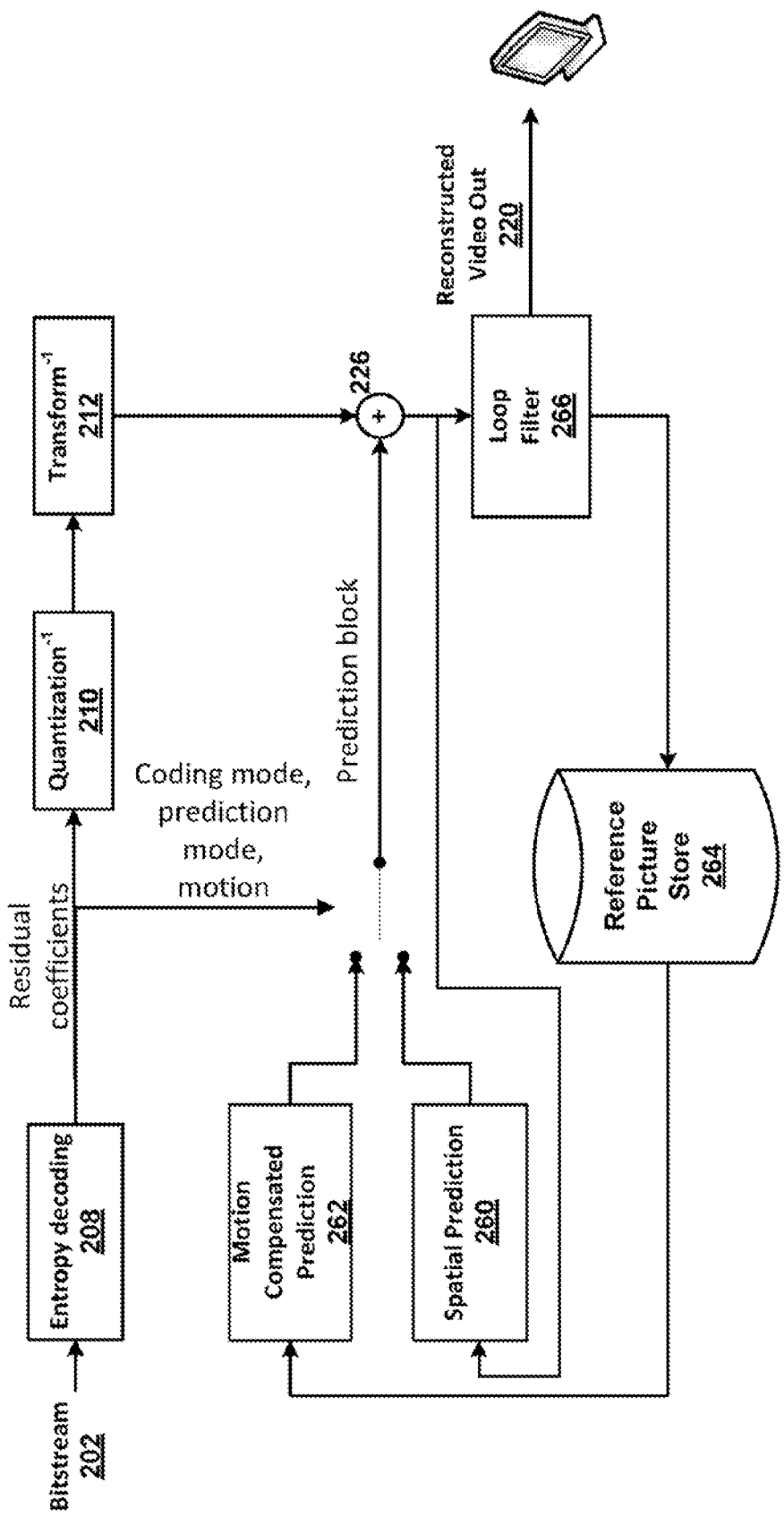
FIG. 2 is an example block diagram of block-based hybrid video decoder.

FIG. 2 shows an example of a block-based video decoder. Video bit-stream 202 may be unpacked and entropy decoded at entropy decoding unit 208. Coding mode and prediction information may be sent to the spatial prediction unit 260 (e.g., if intra coded) or temporal prediction unit 262 (e.g., if inter coded), for example, to form a prediction block. Residual transform coefficients may be provided to inverse quantization unit 210 and inverse transform unit 212, e.g., to reconstruct the residual block. A prediction block and a residual block may be added together e.g., at summation 226. In-loop filtering may be applied to a reconstructed block, for example, before it is stored in reference picture store 264. Reconstructed video in reference picture store 264 may be sent out, for example, to drive a display device and/or to predict future video blocks. The decoder may include a WTRU (e.g., as described herein), a processor of a WTRU, and/or the like.

Motion information (e.g., MVs and reference picture indices) may be determined by an encoder and (e.g., explicitly) transmitted to a decoder. A significant amount of overhead may be spent on coding motion parameters for inter-coded blocks. Overhead of signaling motion information may be reduced, for example, by a coding mode (e.g., FRUC). The signaling of MVs and/or reference picture indices may be skipped, for example, when FRUC coding mode is enabled for a CU. Information may be derived (e.g., on the decoder side), for example, by template-matching or bilateral-matching techniques.

In-loop filters may be employed at the encoder and/or decoder. The in-loop filters may include one or more of a deblocking filter, sample adaptive offset, or ALF. ALF may be a Wiener filter that may be applied to a reconstructed block (e.g., to minimize the mean squared error between the original block and reconstructed block). ALF may be trained at the encoder. ALF parameters may be signaled in the bitstream. ALF may be applied to luma and/or chroma components. ALF may be applied to luma components (e.g., Luma ALF) and/or chrome components (e.g., chroma ALF). Luma ALF and chroma ALF may be trained separately. Luma and chroma components may not share a common ALF.

Figure 3:
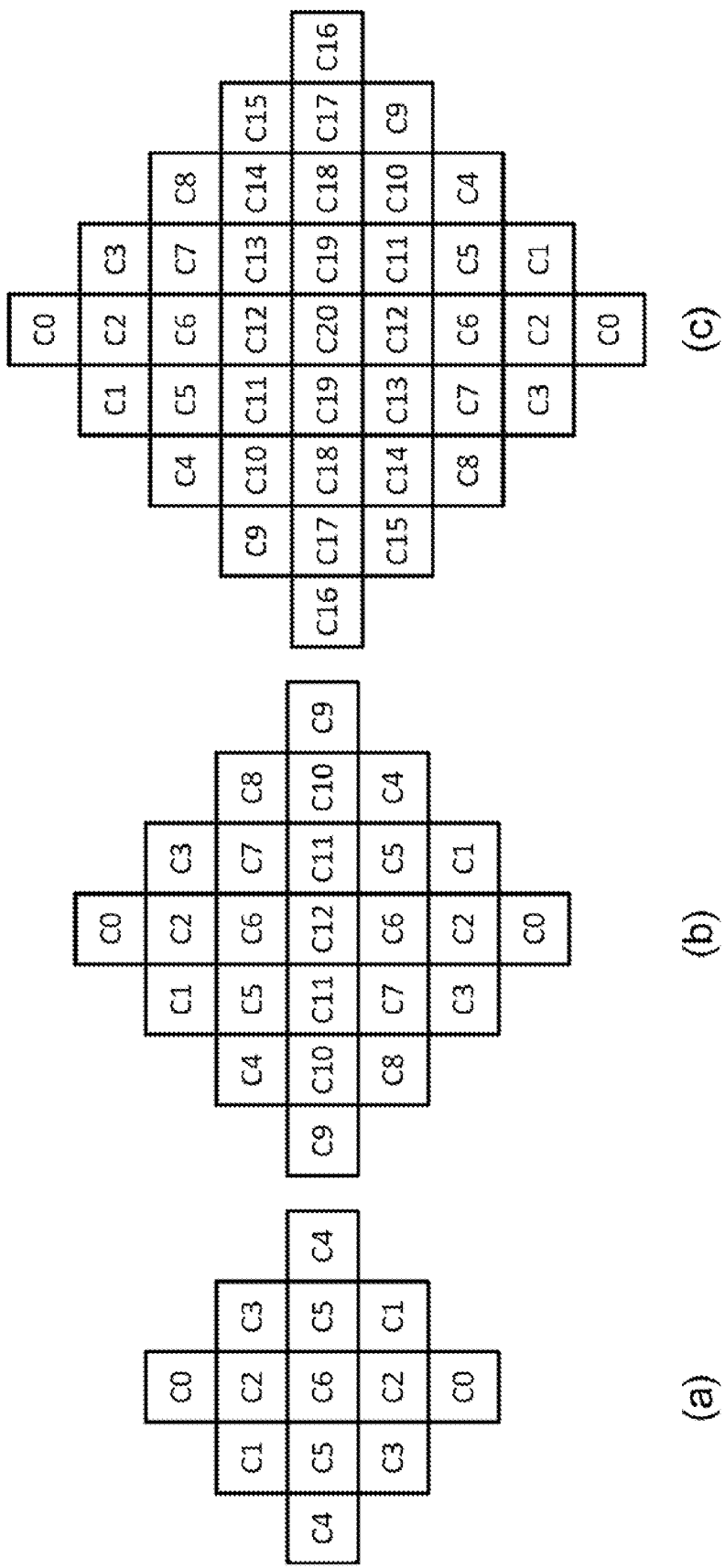
FIG. 3 shows an example of ALF shapes: (a) 5×5 diamond shape, (b) 7×7 diamond shape, and (c) 9×9 diamond shape.

Chroma ALF may have fewer options when compared to luma ALF. For example, luma ALF may choose among three different filter shapes: 5×5 diamond, 7×7 diamond, and 9×9 diamond. FIG. 3 shows an example of ALF shapes: (a) 5×5 diamond shape, (b) 7×7 diamond shape, and (c) 9×9 diamond shape. Chroma ALF may (e.g., may always) use a 5×5 diamond shape filter. For luma ALF, ALF may be applied on an entire frame using a frame-level ALF or applied block-wise using a block-level ALF. Frame-level ALF may be used for chroma ALF. For luma ALF, block classification may be performed on each 2×2 block to categorize them into one out of 25 classes. Each class may use a different ALF filter. Block classification may not be performed on a chroma component. The chroma samples in a tame may be considered to belong to a class (e.g., class zero).

Figure 4:
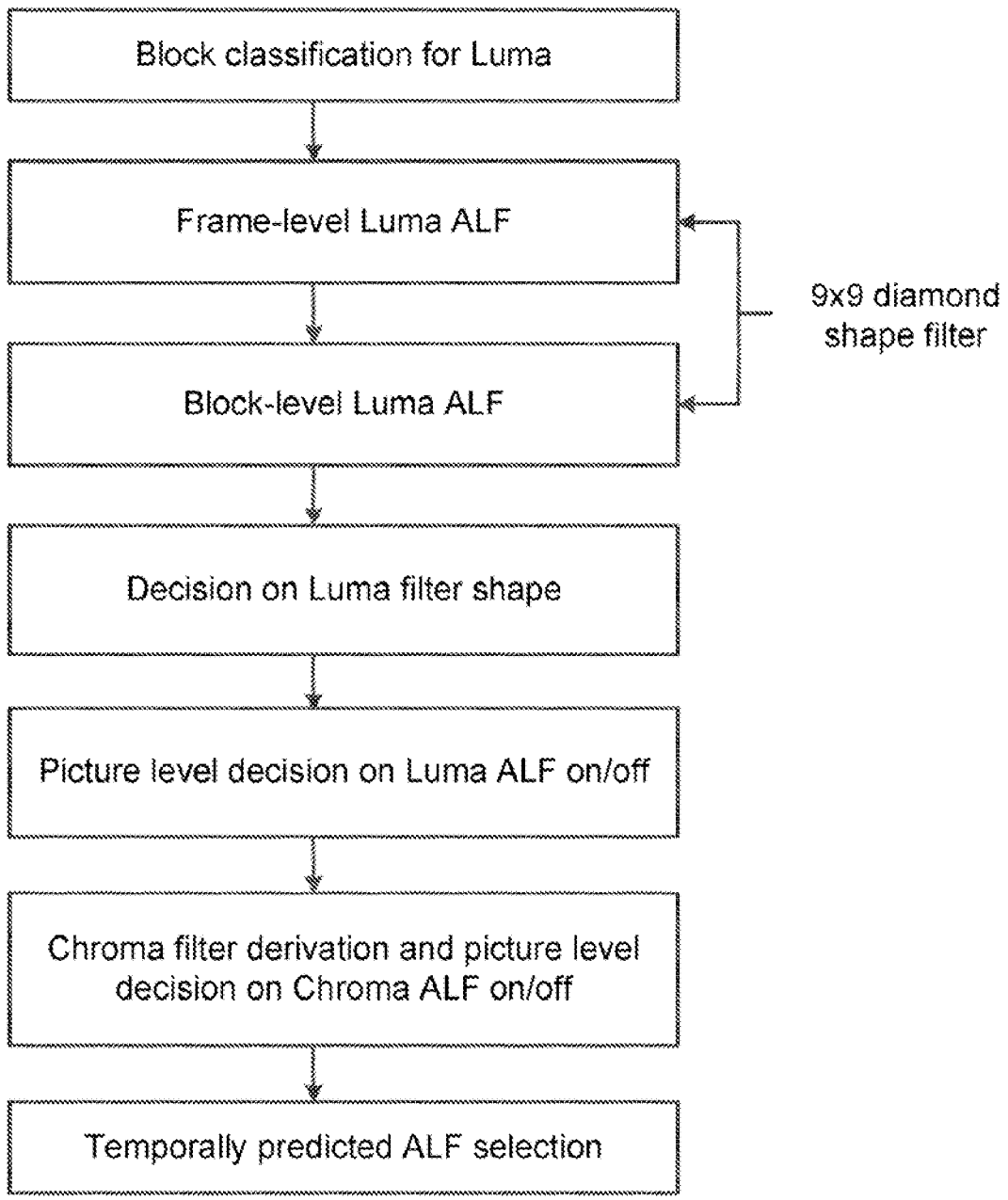
FIG. 4 shows an example of an ALF procedure at the encoder.

Block classification may be performed on reconstructed luma samples. FIG. 4 shows an example of an ALF procedure at the encoder. Block classification may be performed on luma components of a reconstructed frame to classify one or more (e.g., each) 2×2 block. The encoder may train 9×9 frame-level luma ALF for a (e.g., each) class, for example, using corresponding reconstructed and original pixels in the frame. The encoder may train 9×9 block-level ALF by testing for some (e.g., al possible) ALF block depths ($alf_{depth_i}$). The 9×9 frame-level and/or block-level luma ALF may be in a diamond shape. For an ALF block depth, the encoder may run one or more (e.g., two) iterations.

For example, in a first iteration; the frame filtered by the 9×9 frame-level ALF may be used as a starting point. The encoder may determine a block partition for a coding tree unit (CTU) for using the block-level ALF. The encoder may start at the CTU, and recursively split the CTU into four equal sub-blocks, for example, if the current block depth is less than the associated CU depth and ($alf_{depth_i}$). If the current block depth is not less than the associated CU depth and ($alf_{depth_i}$), for the given block, two sum of squared difference (SSD) values may be computed: SSD between the ALF filtered block and original uncompressed block (Filt_SSD), and SSD between unfiltered reconstructed block and the original block (unFilt_SSD). If Filt_SSD is smaller than unFilt_SSD, ALF may be enabled for the block. If Filt_SSD is not smaller than unFilt_SSD, ALF may be disabled for the block. Once the CTUs in the frame are processed, the rate-distortion (RD) cost of the block-filtered frame may be computed, and the block-filtered frame's associated ALF parameters may be saved.

In a second iteration, a different set of ALFs may be trained using blocks that chose ALF in the first iteration. The different set of ALFs may be applied as frame-level ALFs to a reconstructed frame (e.g., the entire reconstructed frame). The encoder may determine a block partition for one or more (e.g., each) CTU for using the different set of ALFs. The encoder may start at the CTU. The encoder may recursively split the CTU into four equal sub-blocks, for example, if the current block depth is less than the associated CU depth and ($alf_{depth_i}$). If the current block depth is not less than the associated CU depth and ($alf_{depth_i}$), for the given block, two sum of squared difference (SSD) values may be computed: SSD between the ALF filtered block and original uncompressed block (Filt_SSD), and SSD between unfiltered reconstructed block and the original block (unFilt_SSD). If Filt_SSD is smaller than unFilt_SSD, ALF may be enabled for the block. If Filt_SSD is not smaller than unFilt_SSD, ALF may be disabled for the block. Once the CTUs in the frame are processed, the rate-distortion (RD) cost of the block-filtered frame may be computed, and the block-filtered frame's associated ALF parameters may be saved.

A candidate block-level ALF that yields the least RD cost may be chosen as the block-level ALF. The RD cost of frame-level and the RD cost block-level ALFs may be compared. A frame-level and/or a block-level ALF (e.g., of a filter shape) that yields a lower RD cost may be chosen. The encoder may test for other filter shapes (e.g., 7×7 and 5×5 filters) and/or select one with a lower RD cost. The RD cost of a selected tame-level or a block-level ALF at the selected filter shape may be compared with the RD cost if ALF is not used. A scheme that yields lower RD cost may be determined. Based on the determination, a picture level ALF flag (e.g., alf_flag) may have a value of one (e.g., indicating ALF on) or zero (e.g., indicating ALF off). When luma ALF is enabled, chroma ALF may be computed. A decision on whether to use chrome ALF for a frame or a picture may be made based on the RD cost.

A test (e.g., as performed for the current frame) may be performed to check for ALFs generated for previous frames. The previous frames may belong to the same temporal layer as the temporal layer of the current frame or temporal layers that are lower than the temporal layer of the current frame. If using an ALF generated for a previous frame yields lowest RD cost, a temporal prediction lag of one and an index to the previous ALF may be signaled.

Block classification may be performed on the luma components of a (e.g., each) 2×2 reconstructed block to categorize the reconstructed block into one out of 25 classes. A classification index C may be derived, for example, in accordance with Eq. 1.

$$C = 5D + \hat{A} \qquad \text{Eq. 1}$$

D may be the directionality, and $\hat{A}$ may be the quantized value of activity. To calculate D and $\hat{A}$, horizontal, vertical and two diagonal direction gradients may be calculated using 1-D Laplacian, for example, in accordance with Eq. 2-5. The gradients in horizontal, vertical and two diagonal directions may be referred to as directional gradients.

$$g_v = \sum_{k=i-2}^{i+3} \sum_{l=j-2}^{j+3} V_{k,l}, \ V_{k,l} = |2R(k, l) - R(k, l-1) - R(k, l+1)| \qquad \text{Eq. 2}$$

$$g_h = \sum_{k=i-2}^{i+3} \sum_{l=j-2}^{j+3} H_{k,l}, \ H_{k,l} = |2R(k, l) - R(k-1, l) - R(k+1, l)| \qquad \text{Eq. 3}$$

$$g_{d0} = \sum_{k=i-2}^{i+3} \sum_{l=j-3}^{j+3} D1_{k,i}, \qquad \text{Eq. 4}$$

$$D1_{k,i} = |2R(k, l) - R(k-1, l-1) - R(k+1, l+1)|$$

$$g_{d1} = \sum_{k=i-2}^{i+3} \sum_{j=j-2}^{j+3} D2_{k,i}, \qquad \text{Eq. 5}$$

$$D2_{k,i} = |2R(k, l) - R(k-1, l+1) - R(k+1, l-1)|$$

i and j may refer to the coordinates of the upper lei sample in the 2×2 reconstructed block, and R(i,j) may indicate a reconstructed sample at coordinate (i,j). The maximum and minimum values of horizontal and vertical gradients may be set as, for example, in Eq. 6.

$$g_{h,v}^{max} = \max(g_h, g_v), g_{h,v}^{min} = \min(g_h, g_v) \qquad \text{Eq. 6}$$

The maximum and minimum values of two diagonal gradients may be set as, for example, in Eq. 7.

$$g_{d0,d1}{}^{max}=\max(g_{d0},g_{d1}), g_{d0,d1}{}^{min}=\min(g_{d0},g_{d1}) \quad \text{Eq. 7}$$

The value of directionality D may be derived by comparing the above values against each other, and with two thresholds $t_1$ and $t_2$ as follows:

Step 1. If both $g_{h,v}{}^{max} \leq t_1 \cdot g_{h,v}{}^{min}$ and $g_{d0,d1}{}^{max} \leq t_1 \cdot g_{d0,d1}{}^{min}$ are true, D may be set to 0.

Step 2. If $g_{h,v}{}^{max}/g_{h,v}{}^{min} > g_{d0,d1}{}^{max}/g_{d0,d1}{}^{min}$, continue from Step 3; otherwise continue from Step 4.

Step 3. If $g_{h,v}{}^{max} > t_2 \cdot g_{h,v}{}^{min}$, D may be set to 2; otherwise D may be set to 1.

Step 4. If $g_{d0,d1}{}^{max} > t_2 \cdot g_{d0,d1}{}^{min}$, D may be set to 4; otherwise D may be set to 3.

The activity value Â may be calculated as, for example, in accordance with Eq. 8.

$$A = \sum_{k=i-2}^{i+3} \sum_{l=j-2}^{j+3} (V_{k,l} + H_{k,l}) = g_v + g_h$$

A may be further quantized to the range of 0 to 4, inclusively, and the quantized value may be denoted as Â.

IC may be used for inter prediction of content that has illumination change across time. UC may involve deriving a scale factor 'a' and/or an offset 'b' by a least-squares approach for inter-coded CUs. For example, neighboring reconstructed samples and the corresponding temporal reference samples indicated by the motion information may be used in the least-squares approach. The encoder may check whether UC is enabled for a picture, for example, based on whether there is illumination change between the current picture and the current picture's reference pictures. Histograms of the current picture and reference picture(s) of the current picture may be computed at the encoder. If the histogram difference between the current picture and reference picture(s) is less than a given threshold, IC may be disabled for the current picture. If the histogram difference between the current picture and reference picture(s) is greater than a given threshold. LIC may be enabled for the current picture.

ALF, as an in-loop process, may be applied to reconstructed luma and/or chroma samples (e.g., at the encoder and/or the decoder). An ALF procedure may include one or more of block classification or filtering. The block classification may be based on a granularity of 2×2 blocks. The filtering may be based on one or more tilter sizes from the set of {9×9, 7×7, 5×5}.

For different ALF procedures, computational complexity of the encoder and/or the decoder may vary. Some ALF procedures may be associated with less computational complexity than other ALF procedures. As an example, for block classification, the computational complexity of an encoder and/or a decoder may be reduced by selecting a subset of pixels of a block. The computational complexity of an encoder and/or decoder may be reduced by selectively disabling the filtering.

Performing an ALF procedure may include applying block classification and/or filtering to reconstructed blocks, e.g., at the encoder and/or the decoder. Classifying a 2×2 block may include computing four directional gradients for luma components of the block. Every 2×2 block may be classified. Filtering may include applying a 5×5 diamond filter (e.g., 7 tap), 7×7 diamond filter (e.g., 13 tap) or 9×9 diamond filter (e.g., 21 tap) on luma components, and/or applying 5×5 diamond filter on chroma components. The minimum filter tap may be seven. Filter taps larger than seven may be used for luma components. The symmetry property of ALF may be considered.

The ALF procedures that vary in computational complexity may be used based on a temporal layer and/or a gradient calculation.

An ALF procedure may be applied to a frame based on which temporal layer in a coding scheme the frame is in. The coding scheme may include a hierarchical coding structure. The coding scheme may include multiple temporal layers. A temporal layer may contain one or more frames. Each temporal layer may be associated with a temporal layer level. In a non-limiting example, a coding scheme may include 4 temporal layers at a temporal layer level of 0, 1, 2, and 3, respectively. Frames in temporal layer level 3 and 2 may be in the higher temporal layers within the coding scheme. Frames in temporal layer level 3 may be in the highest temporal layer within the coding scheme. Frames in temporal layer level 0 and 1 may be in the lower temporal layers within the coding scheme. Frames in temporal layer level 0 may be in the lowest temporal layer within the coding scheme. In another non-limiting example, a coding scheme may include 5 temporal layers at a temporal layer level of 0, 1, 2, 3 and 4, respectively. Frames in temporal layer level 2 may be in the middle temporal layer within the coding scheme that includes 5 temporal layers. The frames in the higher temporal layer levels may refer to the frames in the lower temporal layer levels. There may be multiple temporal levels with different quality settings. For example, frames at a lower temporal layer level may have better quality using more coding bits compared to the frames at a higher temporal layer level.

In an example, block classification at one or more of the encoder or decoder may be skipped for a frame in higher temporal layers in the coding scheme. The samples in a higher layer temporal frame may be mapped to one class. The encoder may quantize one or more higher temporal layers using larger QPs. The frames (e.g., reconstructed frames) in the one or more higher temporal layers may be smooth, for example, due to heavy quantization. The frames in the one or more higher temporal layers may contain fewer gradients than frames at lower or middle temporal layers. For the frames in the one or more higher temporal layers, block classification may yield fewer classes than block classification for the lower or middle temporal layers.

In an example, different ALF procedures may include different block classification techniques that vary in computational complexity. Block classification of a reduced computational complexity may be used for the frames in one or more higher temporal layers. For example, for a frame in the one or more higher temporal layers, blocks of the frame may be classified into two classes. For a tame in the middle or lower temporal layers, blocks of the frame may be classified into 25 classes.

Fewer gradients may be calculated for a block in a frame in the one or more higher temporal layers for block classification. For the frame in the one or more higher temporal layers, gradient calculation in one or more of vertical, horizontal, or diagonal directions of pixels of a block in the frame may be skipped. For example, gradient calculation in a diagonal direction of pixels of the blocks may be skipped. A gradient in a horizontal and vertical direction may be calculated (e.g., only).

Figure 5:
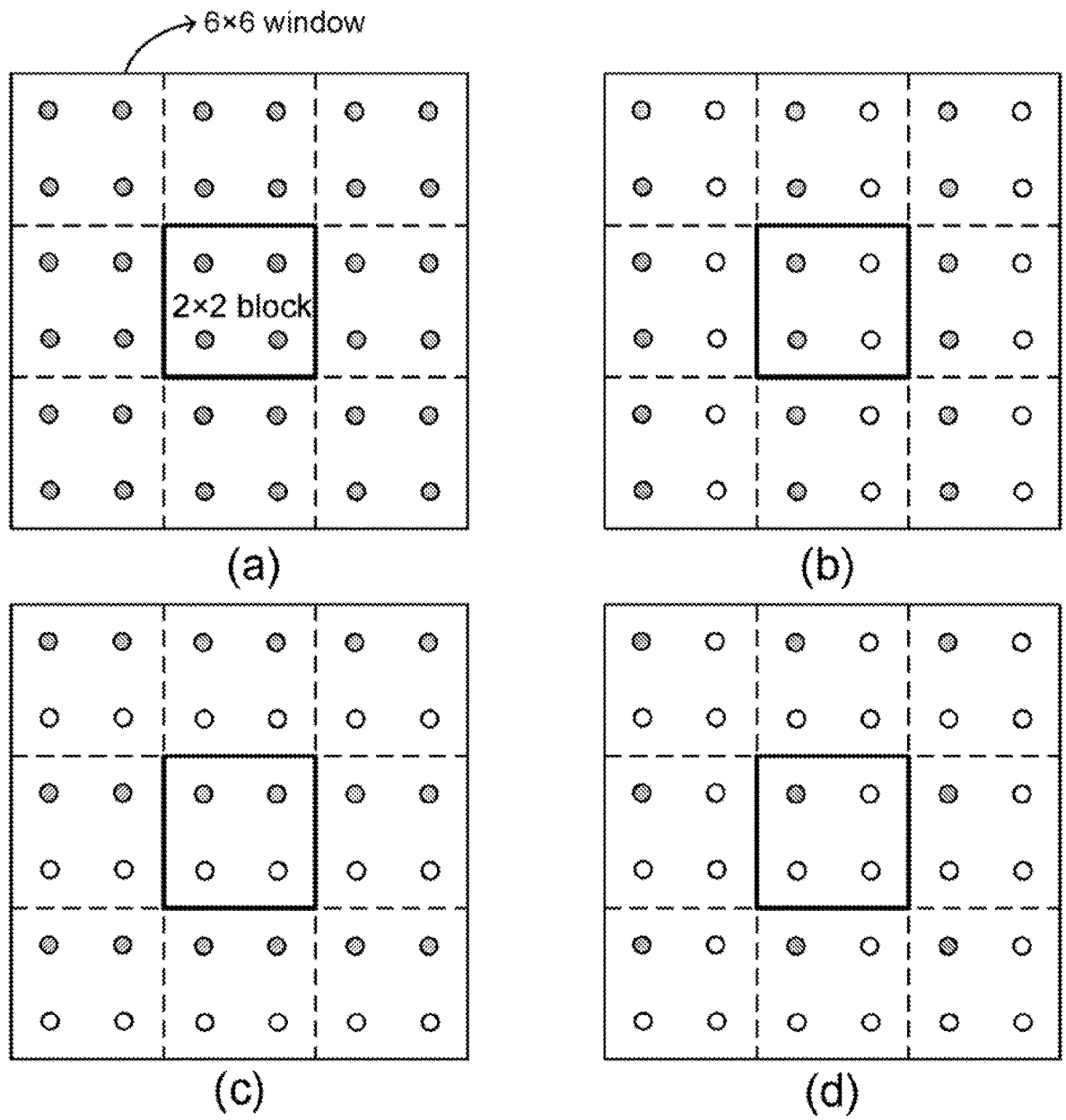
FIG. 5 shows an example of gradient calculation: (a) block classification where for each 2×2 block, gradients may be computed for each pixel in a 6×6 window (b) window subsampled by two in horizontal directions (c) window subsampled by two in vertical directions, and (d) window subsampled by two in horizontal directions and two in vertical directions.

Gradient calculation may be performed for a block in a frame for block classification, for example, based on a subset of pixels in the block. FIG. 5 shows an example of gradient calculation: (a) block classification where for each 2×2 block, gradients may be computed for each pixel in a 6×6 window (b) window subsampled by two in horizontal directions (c) window subsampled by two in vertical directions, and (d) window subsampled by two in the horizontal directions and two in the vertical directions.

In a example, for each 2×2 block, a 6×6 pixel window may be used (e.g., as shown in FIG. 5(a)). For each pixel in this window, four gradients may be computed. The four gradients may include gradients in horizontal, vertical, and two diagonal directions.

Gradients may be calculated for a subset of pixels of a block in a frame for block classification. In an example, the gradients may be calculated for a subset of pixels in the 6×6 pixel window for one or more 2×2 blocks (e.g., as shown in FIG. 5(b)-(d)). Calculating the gradients using the subset of the pixels may reduce the computation complexity (e.g., at the encoder or the decoder). For example, the subset of pixels may be selected from pixels in a (e.g., a current) block by skipping at least one pixel in a horizontal direction of the pixels in the block. FIG. 5(b) may show an example of calculating gradients for a subset of pixels in the 6×6 pixel window for a 2×2 block. As shown in FIG. 5(b), pixels in every other column may be skipped. The number of pixels used for calculating the gradients in the 6×6 pixel window may be reduced (e.g., by a factor of two). Using the subset of pixels (e.g., subsampling), the 6×6 pixel window may become a 3×6 pixel window. Gradients may be computed for one or more (e.g., each) pixel in the 3×6 window. Gradient calculations (e.g., the number of gradients calculated or to be calculated) may be reduced by a factor of two for one or more 2×2 blocks. Gradient calculation (e.g., of Eq. 2-5) may be updated based on the subset of the pixels. For example, subsampling operation may be incorporated into the gradient calculation of Eq. 2-5. The updated set of gradient equations for a reduced number (e.g., a subset) of pixels in the horizontal direction by a factor of two may be given by Eq. 9-12.

$$g'_v = 2\left(\sum_{k=i-2}^{\frac{i+3}{2}} \sum_{l=j-2}^{\frac{j+3}{2}} V_{2k,l}\right), \quad \text{Eq. 9}$$

$$V_{2k,l} = |2R(2k, l) - R(2k, l-1) - R(2k, l+1)|$$

$$g'_h = 2\left(\sum_{k=i-2}^{\frac{i+3}{2}} \sum_{l=j-2}^{\frac{j+3}{2}} H_{2k,l}\right), \quad \text{Eq. 10}$$

$$H_{2k,l} = |2R(2k, l) - R(2k-1, l) - R(2k+1, l)|$$

$$g'_{d0} = 2\left(\sum_{k=i-2}^{\frac{i+3}{2}} \sum_{l=j-3}^{\frac{j+3}{2}} D1_{2k,l}\right), \quad \text{Eq. 11}$$

$$D1_{k,l} = |2R(2k, l) - R(2k-1, l-1) - R(2k+1, i+1)|$$

$$g'_{d1} = 2\left(\sum_{k=i-2}^{\frac{i+3}{2}} \sum_{l=j-3}^{\frac{j+3}{2}} D2_{2k,l}\right), \quad \text{Eq. 12}$$

$$D2_{k,i} = |2R(2k, l) - R(2k-1, l+1) - R(2k+1, l-1)|$$

The gradients as calculated Eq. 9-12 may be multiplied by a subsampling factor (e.g., two) to retain the range of values of the gradients before the subsampling.

Gradients may be computed for a subset of pixels vertically subsampled. FIG. 5(c) may show an example of calculating gradients for a subset of pixels in the 6×6 pixel window for a 2×2 block. As shown in FIG. 5(c), pixels in every other row in vertical directions may be skipped. Using the subset of pixels (e.g., subsampling), the 6×6 pixel window may become a 6×3 window as shown in FIG. 5(c).

Gradients may be computed for a subset of pixels vertically and horizontally subsampled. FIG. 5(d) may show an example of calculating gradients of a subset of pixels in the 6×6 pixel window for a 2×2 block. As shown in FIG. 5(d), pixels in every other row in vertical directions and every other column in horizontal directions may be skipped. Using the subset of pixels (e.g., subsampling), the 6×6 pixel window may become a 3×3 window as shown in FIG. 5(d).

A subset of pixels may be used for gradient calculation in different block classification schemes. For example, a subset of pixels may be selected to calculate the gradients for block classification that is performed on a 4×4 block with an 8×8 pixel window.

Gradients may be calculated for a subset of pixels in a block of a frame belonging to higher temporal layers (e.g., the highest temporal layer or the next highest temporal layer) and/or middle temporal layers. Gradients may be calculated for a subset of pixels in a block of a fame belonging to lower temporal layers. Bocks in fames belonging to higher temporal layers may be smoother (e.g., have weak edges). Gradients for a block of a frame belonging to higher temporal layers, middle temporal layers, and/or lower temporal layers may be calculated using a subsampled operation.

In an example, the frames in the highest temporal layer may use a subset of pixels vertically and horizontally subsampled for gradient calculation. At least one pixel in a vertical direction and at least one pixel in a horizontal direction of the pixels in a block may be skipped. For example, if the temporal layer level of the current frame is the highest level within the coding scheme, an ALF procedure for the current frame may be selected. In the ALF procedure for the current frame in the highest temporal layer, a subset of pixels may be selected from pixels in a block of the current frame by skipping every other row of pixels in the vertical direction and every other column of pixels in the horizontal direction. The gradients for the block may be calculated using the selected subset of pixels. The block may be classified for ALF based on the calculated gradients. The block may be a current block.

Frames in a lower temporal layer, a middle temporal layer, or a second highest temporal layer may use subsampling of the pixels in a block in one direction (e.g., only the vertical, only the horizontal direction, or only one of diagonal directions). The subsampling may reduce the pixels in a 6×6 pixel window by a factor of two.

For example, if the temporal layer level of the current frame is higher than the lowest level and lower than the highest level within the coding scheme, an ALF procedure for the current frame may be selected. The ALF procedure selected may differ from an ALF procedure used for a frame in the highest temporal layer. The ALF procedure selected may differ from an ALF procedure used for a frame in the lowest temporal layer. In the ALF procedure, a subset of pixels may be selected from the pixels in a block of the current tame by skipping at least one pixel in one of vertical, horizontal, or diagonal directions of the pixels in the block. The gradients for the block may be calculated using the selected subset of pixels. The block may be classified for ALF based on the calculated gradients.

If the temporal layer level of the current frame is the lowest level within the coding scheme, an ALF procedure for the current frame may be selected. In the ALF procedure for the current frame in the lowest temporal layer, gradients for a block may be calculated using each pixel in the block. The block may be classified for ALF based on the calculated gradients.

The encoder or the decoder may determine or select an ALF procedure for a frame, for example, based on the temporal layer level of the frame (e.g., a current frame). The encoder or the decoder may determine whether a subset of pixels is to be selected for calculating the gradients for block classification. The encoder or the decoder may determine how the subset of pixels is to be selected.

The encoder may signal to the decoder whether subsampling is to be used for the frame. The encoder may signal which subsampling is to be used for the frame. In an example, an indication of whether subsampling to be used and/or an indication of which subsampling scheme is to be used may be signaled for each frame. For example, the indication may be a syntax element signaled in the bitstream.

The encoder may determine or select an ALF procedure by comparing RD cost. The encoder may perform ALF (e.g., as described herein) without subsampling for a frame. If ALF is selected or enabled for the frame, the encoder may perform different ALF procedures and/or compute RD cost associated with the ALF procedures. For example, the encoder may repeat an ALF process using different subsets of pixels in each of the subsampling schemes (e.g., as described herein) and/or compare RD cost associated with each subsampling scheme.

The encoder may signal an indication if certain conditions me met. Eq. 13 shows an example of the conditions.

$$RD_{minSub} < \omega RD_{ref},$$ Eq. 13 where $RD_{minSub} = \min(RD_V, RD_H, RD_{HV})$

Figure 6:
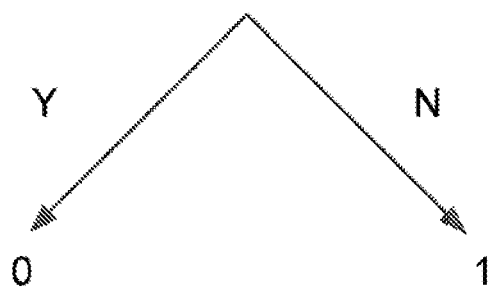
FIG. 6 shows an example of building a prefix code for different subsampling schemes.
Figure 6:
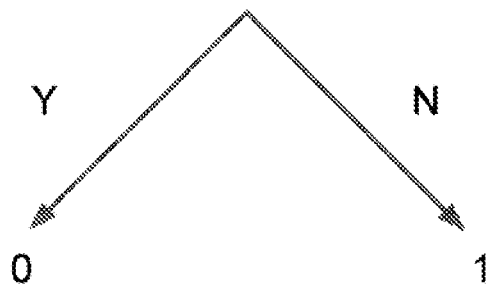

In Eq. 13, $RD_{ref}$ and $RD_{minSub}$ may represent the RD cost of a scheme (e.g., a reference scheme) and the minimum RD cost among different subsampled schemes, respectively. ω may represent a scale factor larger than one. If one of the conditions of Eq. 13 is satisfied, the encoder may signal one or more of the following: a subsampling flag having a value of one or an index to a subsampling scheme. The signaling may be performed on a frame-level in a picture parameter set or in a slice header. In an example, a prefix code may be built as an index for a (e.g., each) subsampling scheme. FIG. 6 shows an example of building a prefix code for different subsampling schemes. As shown in FIG. 6, a decision may be made on whether a vertical subsampling is used. If a vertical subsampling is used, an index or a digit of an index may be set to zero. If a vertical subsampling is not used, an index or a digit of an index may be set to one. A decision may be made on whether a horizontal subsampling is used. If a horizontal subsampling is used, an index or a digit of an index may be set to zero. If a horizontal subsampling is not used, an index or a digit of an index may be set to one. Table 1 may show a resulting index map. If neither condition in Eq. 13 is satisfied, a subsampling lag having a value of zero may be signaled in the bitstream.

Table 1 may describe an example of indices for different subsampling schemes.

TABLE 1

| Subsampling | Index (binary representation provided inside parenthesis) |
|---|---|
| Vertical | 0 (0) |
| Horizontal | 2 (10) |
| Both vertical and horizontal | 3 (11) |

The decoder may receive the indication of whether subsampling is to be used for the tame and/or the indication which subsampling is to be used for the frame. The decoder may determine subsampling is to be used for the frame and/or which subsampling is to be used for the frame based on the indication(s). The decoder may perform ALF based on the indicated subsampling scheme. The decoder may skip subsampling based on the indication that subsampling is to be skipped for the frame.

In an example, the value of ω in Eq. 13 may be set to one. For example, the value of ω equaling to one may indicate no bias is given to a reference ALF scheme. The subsampling may be applied (e.g., only applied) to ALF block classification, and/or may not necessarily increase an RD cost of a filtered frame. In an example, the value of ω in Eq. 13 may be set to les than one. The value of ω less than one may give a bias toward the reference ALF scheme.

ALF procedures that vary in computational complexity may include various filtering operations. For example, an ALF procedure of a reduced computational complexity may skip one or more filtering operations.

Frame-adaptive ALF skip may be used to reduce computational complexity. For example, as shown in FIG. 4, the encoder may determine and/or select an ALF used on Luma components (e.g., luma ALF) for a given frame. The luma ALF may be one that produces the least RD cost (e.g., the best luma ALF) among multiple luma ALF. The encoder may compare the RD cost of the frame that is filtered using the determined luma ALF with that of an unfiltered frame. The encoder may make a picture-level decision on whether to use the luma ALF for the frame.

If a luma ALF is not used (e.g., chosen) for luma components of the frame, the encoder may not test a chrome ALF for chroma components of the frame. The encoder may test for temporally predicted ALFs. The encoder may determine (e.g., select or choose) a temporally predicted ALF based on the testing. The selected temporally predicted ALF may yield the least RD cost among the temporally predicted ALFs and/or ALFs from the current frame.

Figure 7:
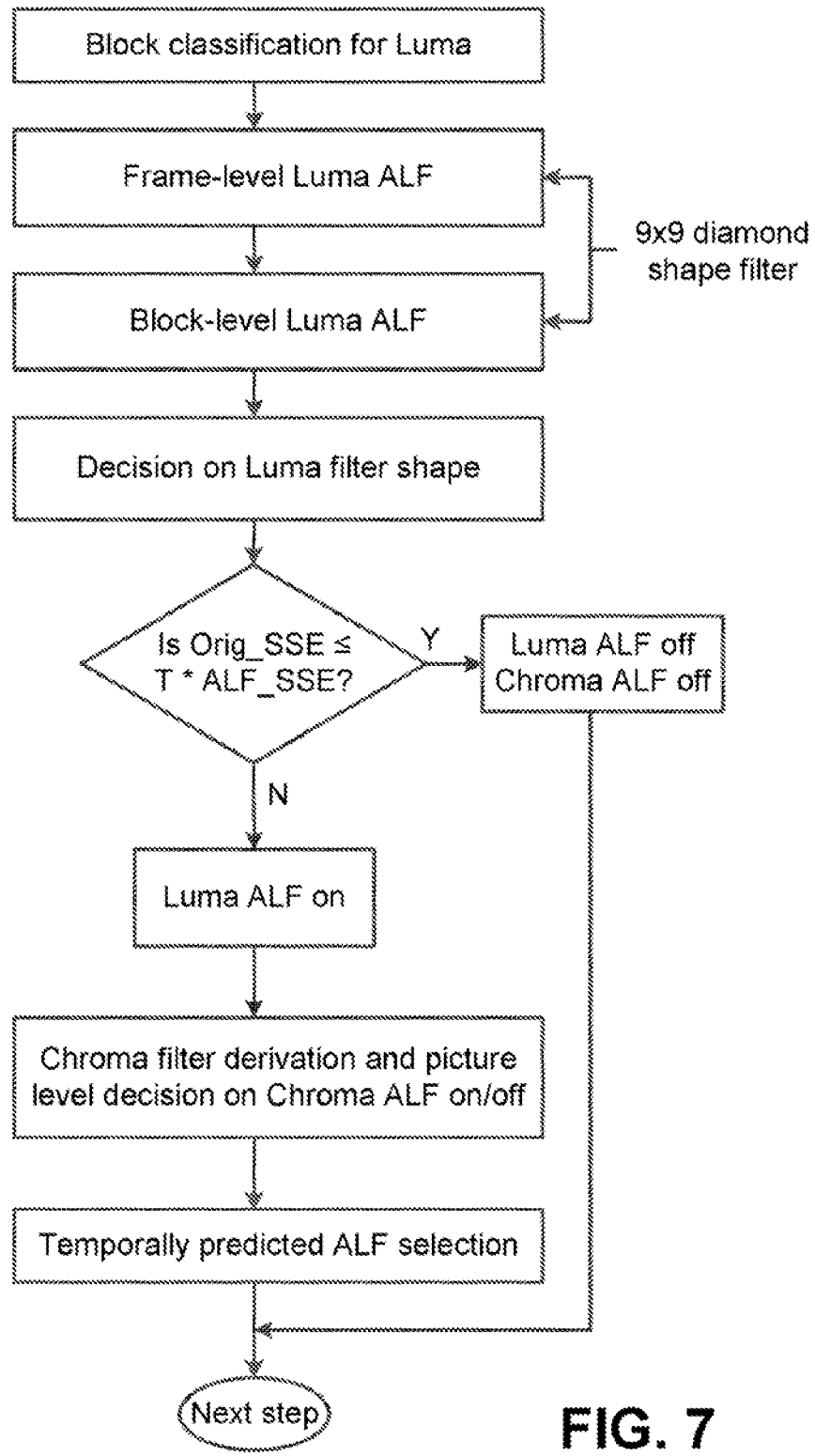
FIG. 7 shows an example of an ALF procedure of a reduced computational complexity using frame-adaptive ALF skip.

FIG. 7 shows an example of an ALF procedure of a reduced computational complexity using frame-adaptive ALF skip. ALF may be skipped or disabled for frames in higher temporal layers. QPs may be larger for the frames in the higher temporal layers. In an example, ALF may be skipped or disabled for frames (e.g., only) in the highest temporal layer.

As shown in FIG. 7, block classification may be performed for luma samples in an ALF procedure. A frame-level luma ALF may be performed (e.g., starting with 9×9 diamond shape filter). A block-level luma ALF may be performed (e.g., starting with 9×9 diamond shape filter). A luma filter shape may be determined. An appropriate luma approach (e.g., the luma approach having the least RD cost) may be determined. Block classification may be performed on luma components of a reconstructed frame to classify one or more (e.g., each) 2×2 block. The encoder may train 9×9 frame level luma ALF for a (e.g., each) class, for example, using corresponding reconstructed and original pixels in the frame. The encoder may train 9×9 block-level ALF by testing for some (e.g., all possible) ALF block depths ($alf_{depth_i}$). The 9×9 frame-level and/or block-level luma ALF may be in a diamond shape. The encoder may test for other filter shapes (e.g., 7×7 and 5×5 filters) and/or select one with a lower RD cost. The RD cost of a selected frame-level or a block-level ALF at the selected filter shape may be compared with the RD cost if ALF is not used. A scheme that yields lower RD cost may be determined.

The sum of the squared error (SSE) of the associated filtered frame (ALF_SSE) may be computed with respect to the original frame (e.g., by the encoder). The sum of the squared error (SSE) of the associated filtered frame (ALF_SSE) may be compared to the SSE of the unfiltered frame (Orig_SSE) as shown in Eq. 14.

$$\text{Orig\_SSE} \leq T*\text{ALF\_SSE} \qquad \text{Eq. 14}$$

T may be the bias factor. In an example, T may be set to 1.003. If the Orig_SSE is less than or equal to the result of the ALF_SSE multiplied by the bias factor T, ALF may be disabled for luma and chroma components of a given frame. If the Orig_SSE is greater than the result of the ALF_SSE multiplied by the bias factor, the encoder may enable the use of ALF for luma components of the frame. Chroma filters may be derived and whether to apply chroma ALF to the chroma components of the frame may be determined. Temporally predicted ALFs may be checked.

The bias factor may allow the encoder to disable ALF if a frame distortion of the unfiltered frame (Orig_SSE) is within a given tolerance from the ALF filtered frame distortion (ALF_SSE). The bias factor may enable more frames to be processed (e.g., encoded or decoded) with ALF disabled than if the bias factor is not used. The bias factor may be set to a value that favors skipping ALF. For example, if the bias factor is set to a larger value, skipping ALF may be favored. The decoder may skip or disable ALF, for example, upon receiving an indication from the encoder.

The bias factor may be set differently for frames in different temporal layers. The bias factor may be set to a value that favors skipping ALF for frames in higher temporal layers. For example, the bias factor for frames in the higher temporal layers within a coding scheme may be set larger than the bias factor for frames in the lower temporal layers.

The bias factor may be set differently for frames related to different QP used for picture coding. The bias factor may be set to a value that favors skipping ALF for frames related to larger coding QP For example, the bias factor for frames related to larger coding QP may be set larger than the bias factor for frames related to smaller coding QP.

The bias factor may be set differently for frames related to different frame resolutions. The bias factor may be set to a value that favors skipping ALF for frames having smaller resolution. For example, the bias factor for frames having larger resolution may be set to relatively smaller than frames having smaller resolution.

The bias factor may be set differently for frames related to different illumination changes. The bias factor may be set based on whether there is an illumination change between a current frame and some (e.g., all) of the current frame's reference frames. The bias factor may be set to a value that favors skipping ALF it the current frame has no illumination change from al of the current frame's reference frames. For example, if no illumination changes between the current frame and all of the current frame's reference frames are detected, the bias factor may be set to a larger value. If the bias factor is set to a larger value, skipping ALF may be favored. If illumination change between the current frame and some (e.g., all) of the current frame's reference frames is detected, the bias factor may be set to a smaller value. Illumination change may be detected through a histogram-based scheme used by local illumination compensation (LIC). If LIC is enabled by the codec, the bias factor may be determined based on whether LIC is enabled for the current frame. For example, if LIC is enabled for a current frame, the bias factor for ALF may be set to a smaller value. If LIC is not enabled for the current frame, the bias factor for ALF may be set to a higher value.

A pixel-adaptive ALF skip may be used for an ALF procedure of a reduced computational complexity. ALF may include a Wiener filter that minimizes a mean squared error between reconstructed samples and original samples. If a reconstructed block is smooth and/or lacks gradients, ALF may be disabled in the ALF procedure with a reduced computational complexity.

As described herein, during block classification, gradients $g_h$, $g_v$, $g_{d0}$ and $g_{d1}$ may be computed for a (e.g., each) 2×2 block. In an example, this gradient information may be employed for making a decision whether to skip ALF filtering for a 2×2 block.

Figure 8:
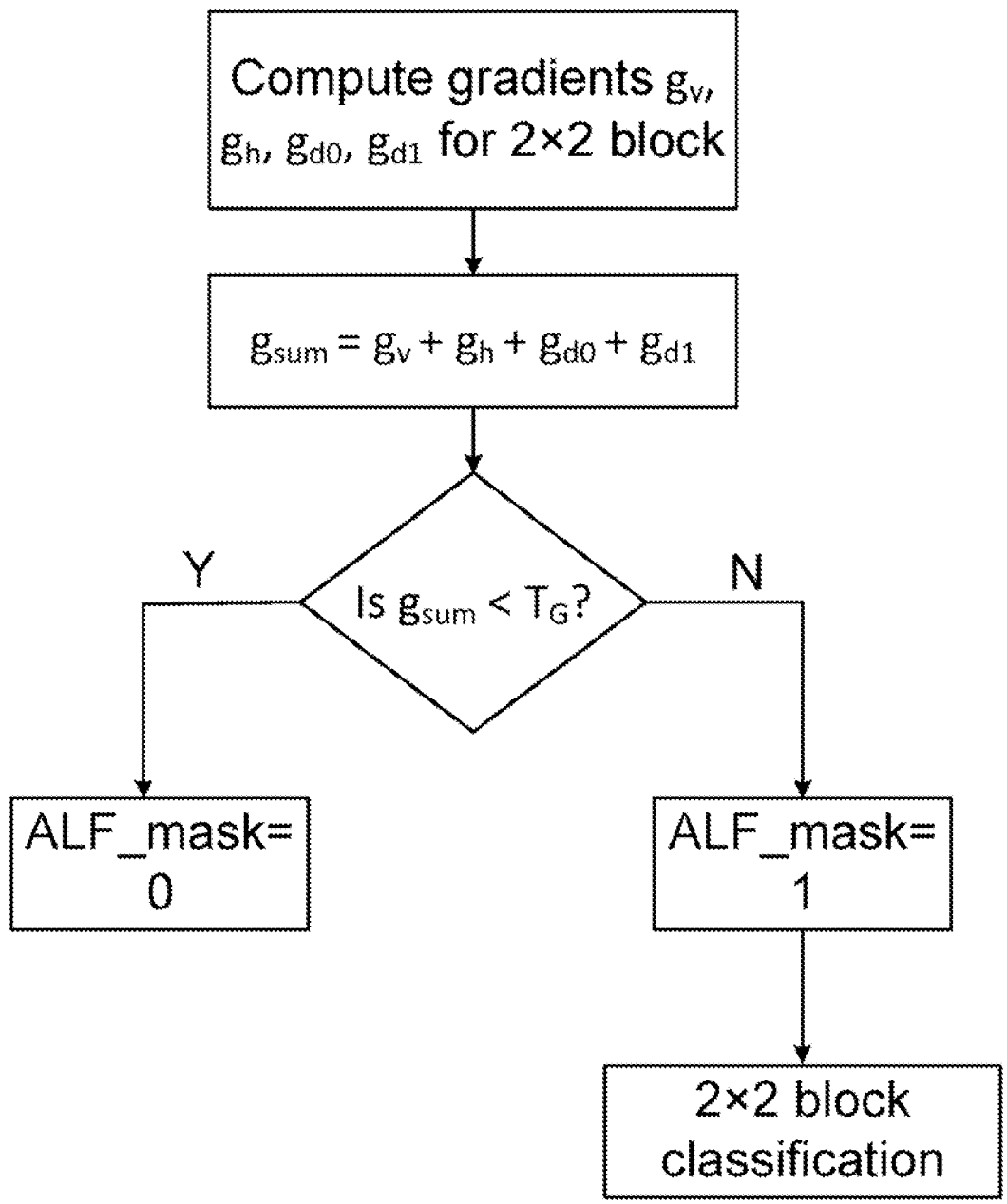
FIG. 8 shows an example of block classification for a 2×2 block with ALF on/off decision using a sum of gradients $g_{sum}$ and threshold $T_G$.

FIG. 8 shows an example of block classification for a 2×2 block with ALF on/off decision using a sum of gradients $g_{sum}$ and threshold $T_G$. For example, the encoder and/or the decoder may make the decision at the block classification stage. The sum of the gradients (e.g., gradient sum) may be computed for a 2×2 block as shown in Eq. 15.

$$g_{sum} = g_v + g_h + g_{d0} + g_{d1} \qquad \text{Eq. 15}$$

H and W may denote the height and width of the video, respectively. A buffer (e.g., ALF ... mask) having dimension $$\frac{W}{2} \times \frac{H}{2}$$

may be maintained at the encoder and/or decoder. The buffer may be used to store information whether luma reconstructed pixels (e.g., reconstructed luma components) in 2×2 blocks are ALF filtered. The gradient sum may be compared to a threshold $T_G$. If the gradient sum is less than the threshold $T_G$, an ALF-on indication (e.g., ALF ... mask flag) associated with the 2×2 block may be set to zero. If the gradient sum is not less than the threshold $T_G$, the ALF-on indication associated with the 2×2 block may be set to one. If the ALF-on indication associated with the 2×2 block is set to one, ALF may be performed for the 2×2 block (e.g., by a decoder).

Figure 9:
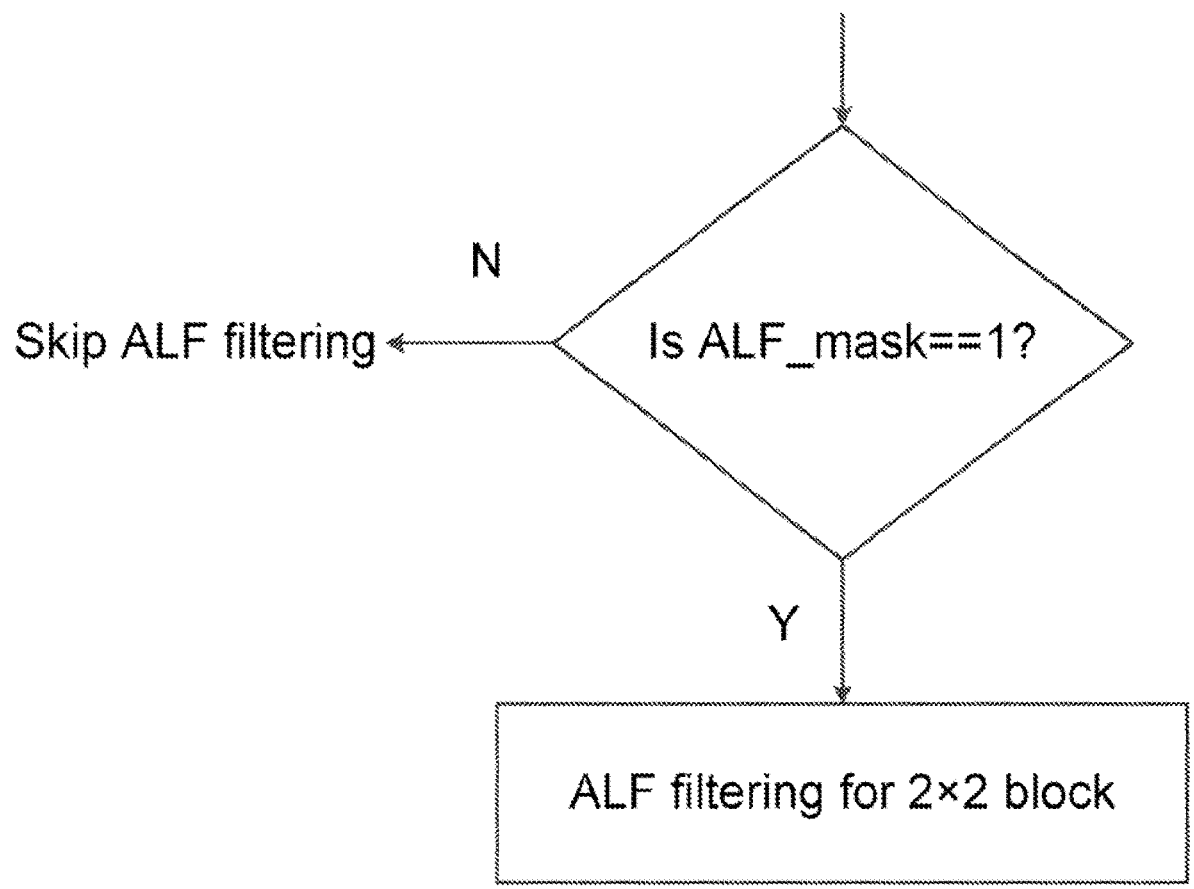
FIG. 9 shows an example of applying ALF for a 2×2 block.

A decision may be made as to whether the ALF-on indication associated with the 2×2 block is equal to one. For example, the decision may be made prior to performing an ALF filtering step. FIG. 9 shows an example of applying ALF for a 2×2 block. As shown in FIG. 9, it may be checked whether the ALF-on indication associated with a given 2×2 block has a value of one. Filtering may be performed when (e.g., only when) a certain condition is satisfied. If the condition is not satisfied, filtering may be skipped for a block (e.g., the current block). As shown in FIG. 9, a decision may be made as to whether an ALF ... mask is equal to one. If the ALF ... mask is not equal to one, ALF may not be applied (e.g., skipped). If the ALF ... mask is equal to one, ALF may be applied to the 2×2 block.

The threshold $T_G$ may be predetermined and/or fixed. In an example, the threshold $T_G$ may be fixed and/or may be derived based on offline training. For coding schemes using temporal layers, a threshold may be offline trained for a respective temporal layer. For example, a threshold may be offline trained for each temporal layer. The threshold (e.g., for each temporal layer) may or may not be signaled. The threshold may be pre-determined and fixed at both the encoder and/or decoder.

Figure 10:
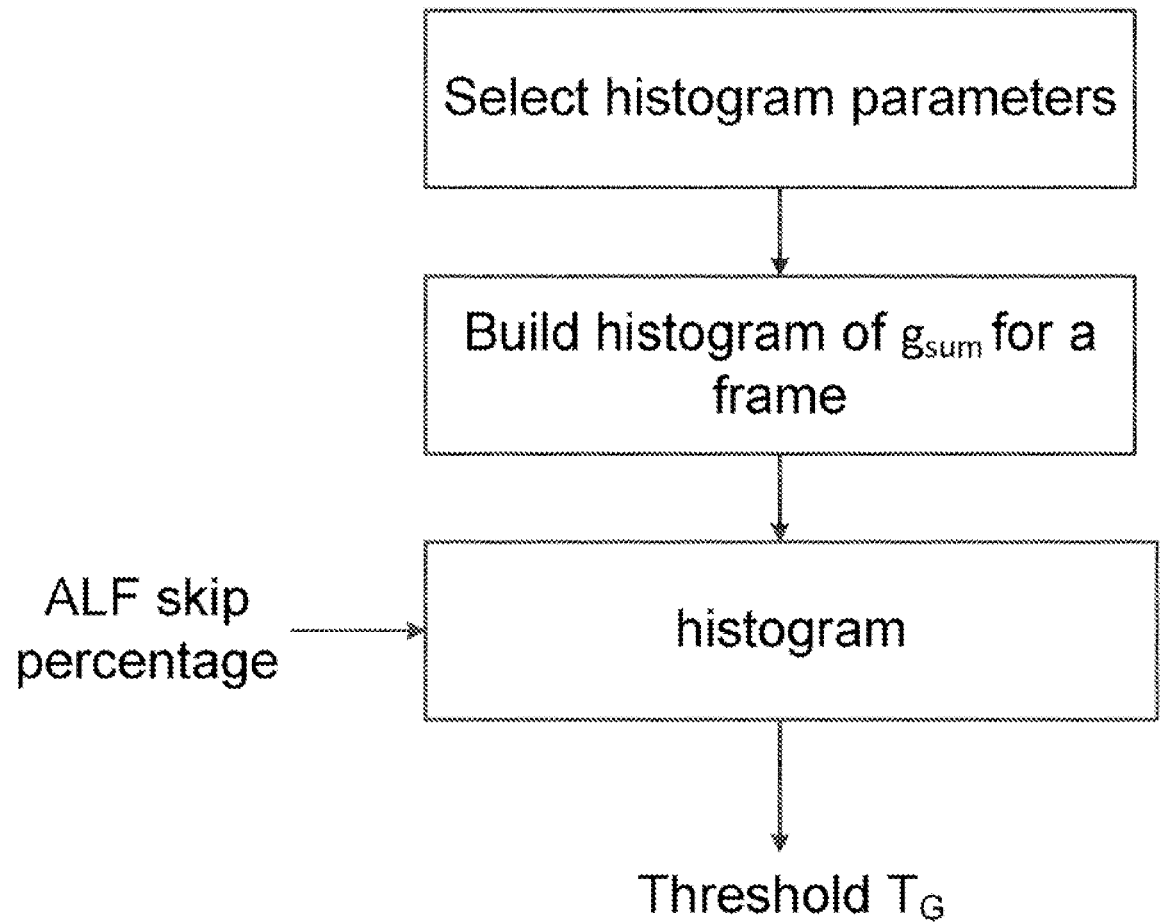
FIG. 10 shows an example of training a threshold $T_G$ using histogram of gradient sum ($g_{sum}$) values for a frame.

The value of threshold $T_G$ may be derived based on, for example, a desired percentage of ALF skip. In an example, the threshold value may be trained during the encoding process. In coding schemes using temporal layers, a threshold may be trained for a respective temporal layer. For example, the first frame of each temporal layer may be used to train a threshold value that is used by subsequent frames in the same temporal layer. This threshold value may be determined based on the percentage of ALF skip desired. The percentage of ALF skip desired may be specified as an input parameter to the encoder. FIG. 10 shows an example of training a threshold $T_G$ using histogram of gradient sum ($g_{sum}$) values for a frame.

As shown in FIG. 10, parameters of the histogram may be selected. The parameters of the histogram may include one or more of a bin size(s), a total number of bins, and a maximum limit of the histogram. During block classification of a frame (e.g., the frame under consideration), the histogram may be built using the gradient sums of the 2×2 blocks in the frame. The resulting histogram may represent a count of occurrence for a (e.g., each) bin of gradient sums. The count associated with the ALF skip percentage may be determined using a skip percentage (ALF_skip_percentage) and a total count of the histogram (total_count), for example, as in Eq. 16.

ALF_skip_count=ALF_skip_percentage*total_count     Eq. 16

The histogram may be examined to determine at which minimum bin index, the accumulated count is greater than or equal to the ALF_skip_count. The examination may start from bin index zero. A value of the selected bin may be used as the threshold $T_G$. The value of the selected bin may include the center value or the maximum value of the selected bin. The value of the selected bin (e.g., the threshold $T_G$) may be used for ALF skip decision for subsequent frames in the same temporal layer. The threshold $T_G$ may or may not be signaled. The threshold $T_G$ may be derived at the encoder and/or decoder.

The threshold $T_G$ may be computed for a (e.g., each) frame in a video sequence. The encoder may signal the threshold $T_G$ once per frame in the bitstream. The decoder may receive the threshold $T_G$ and/or determine whether the ALF-on indication associated with the 2×2 block has a value of one.

The encoder may signal the skip percentage (e.g., only once per sequence). In an example where the encoder may signal the skip percentage only once per sequence, the histogram generation may be performed on a block or group-of-blocks basis at the encoder and/or decoder. Threshold value may be computed at the decoder based on the signaled skip percentage.

Figure 11:
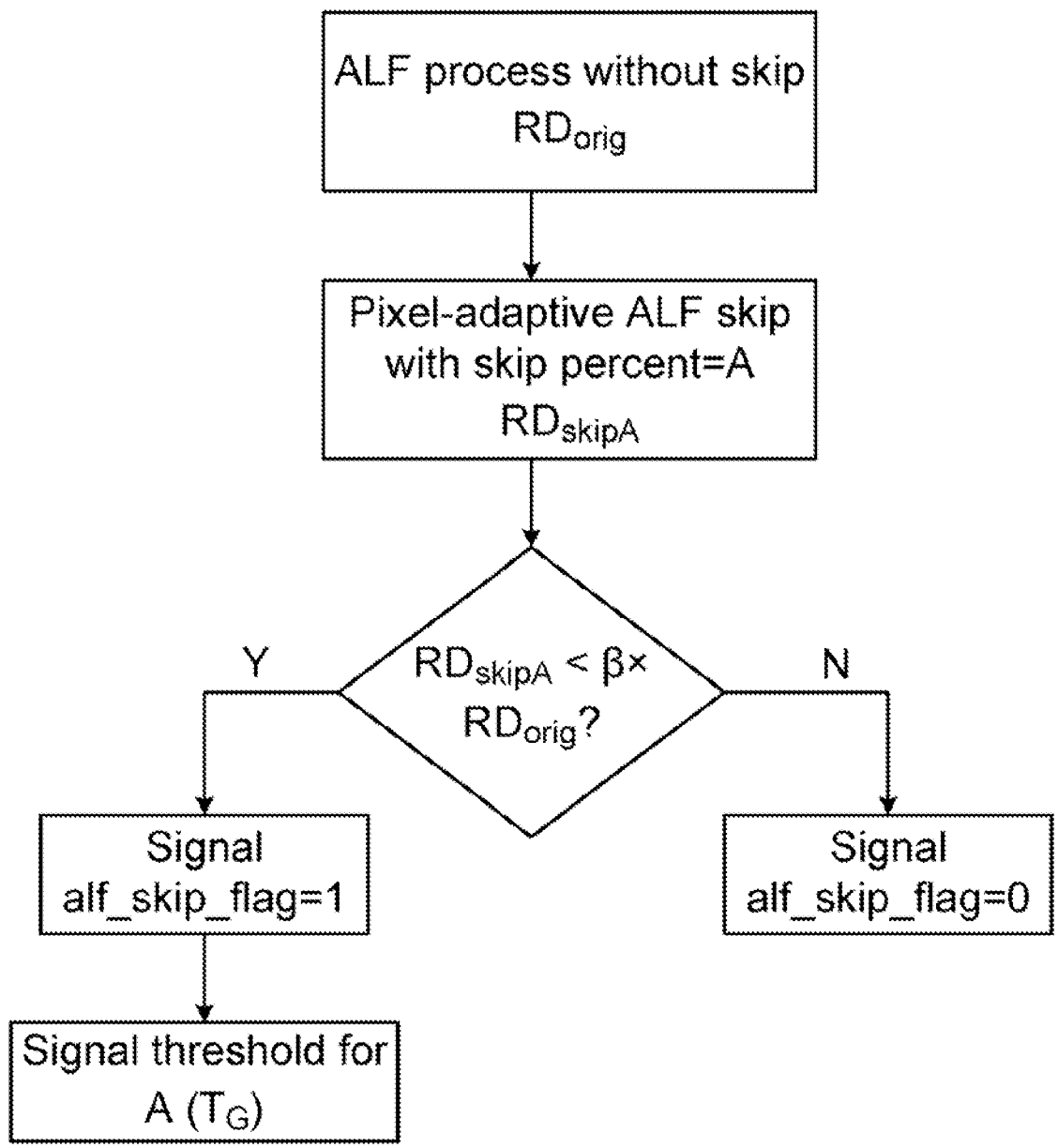
FIG. 11 shows an example rate-distortion (RD)-based approach used for selecting between applying ALF and using pixel-adaptive ALF skip with a skip percentage of 'A'.

Whether to skip ALF may be determined based on RD cost. An encoder may use RD cost to choose between applying ALF and using pixel-adaptive ALF skip for a frame. FIG. 11 shows an example rate-distortion (RD)-based approach used for selecting between applying ALF and using pixel-adaptive ALF skip with a skip percentage of 'A'. Thresholds may be signaled per frame for the skip approach. Signaling may not be performed if thresholds are to be derived at the decoder.

Bas factor β may be used to enable more frames to be processed (e.g., encoded or decoded) with pixel-adaptive ALF skip than if the bias factor is not used. The bias factor may be set to a value that favors enabling pixel-adaptive ALF skip. For example, if the bias factor is set to a larger value, pixel-adaptive ALF skip may be favored.

As shown in FIG. 11, the encoder may perform an ALF and/or may compute the associated RD cost ($RD_{orig}$). The encoder may apply an ALF (e.g., perform an ALF process) for the specified skip percentage 'A'. Applying an ALF for the specified skip percentage 'A' may include computing the threshold $T_G$ and/or performing pixel-adaptive ALF skip. The encoder may compute the associated RD cost ($RD_{skipA}$). The bias factor β may be determined (e.g., chosen) with a value greater than or equal to one. The bias factor β may be multiplied with $RD_{orig}$. The product of multiplying bias factor β with $RD_{orig}$ may be compared with the associated RD cost $RD_{skipA}$. If the product is greater than the associated RD cost $RD_{skipA}$, a flag (e.g., alf_skip_flag) may have a value of one in the bitstream. The alf_skip_flag having a value of one may indicate that pixel-adaptive ALF skip may be applied to the current frame. The threshold $T_G$ for the specified skip percentage 'A' may be signaled. If the product is the same or smaller than the associated RD cost $RD_{skipA}$, alf_skip_flag may have a value of zero in the bitstream. The alf_skip_flag having a value of zero may indicate that ALF may be applied to the current frame.

Figure 12:
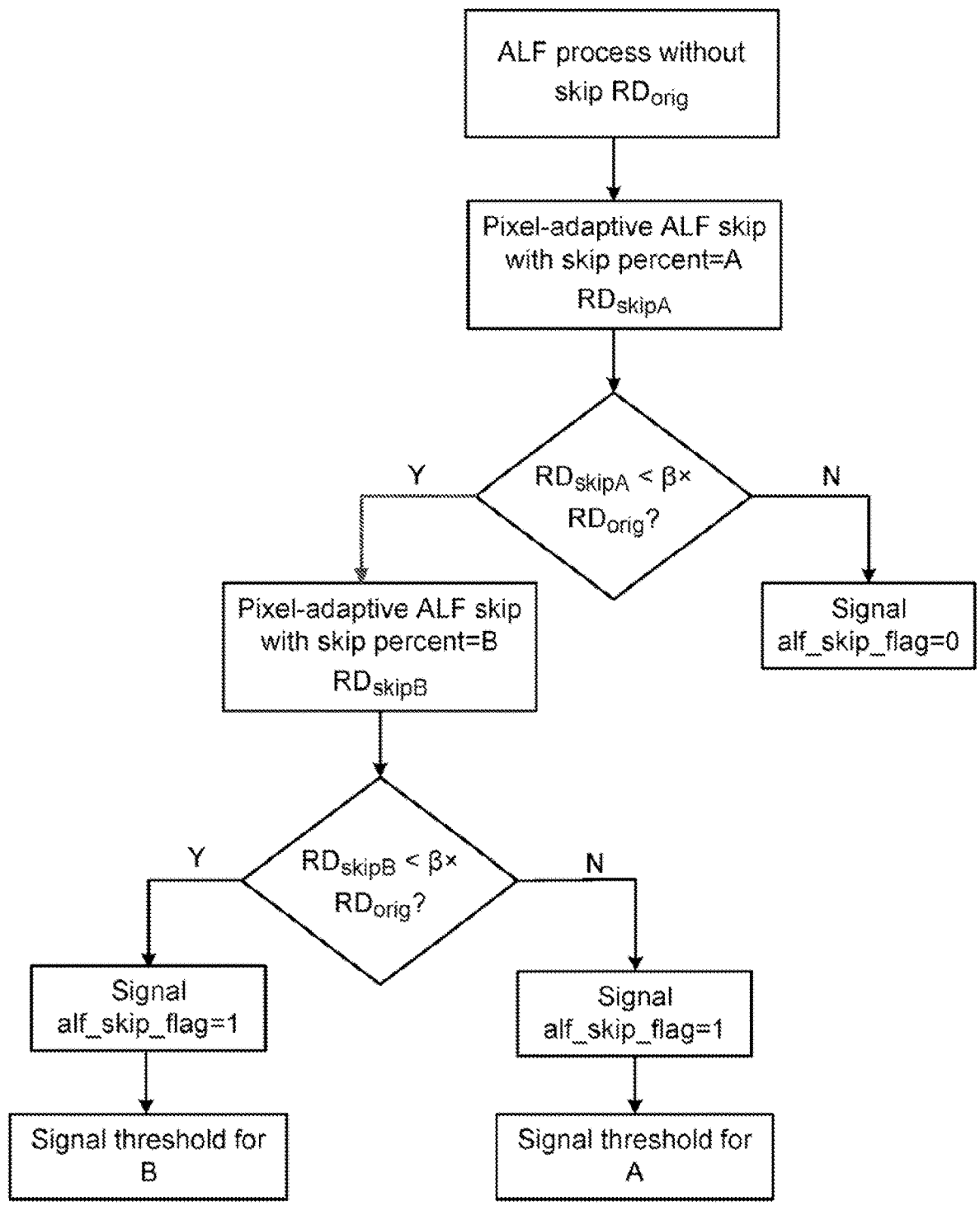
FIG. 12 shows an example RD cost-based selection process when two skip percentages (A and 'B') are specified for a pixel-adaptive ALF skip.

A skip percentage of 'A' and a skip percentage of 'B' may be used (e.g., by an encoder) for selecting between applying ALF and using pixel-adaptive ALF skip. In an example, the approach described in FIG. 11 may be extended to choose from more than one skip percentage. FIG. 12 shows an example RD cost-based selection process when two skip percentages ('A' and 'B') are specified for a pixel-adaptive ALF skip. The skip percentages may be tested in an ascending order, for example, when 'A' is less than 'B', first test for 'A'. As shown in FIG. 11, the encoder may perform an ALF and/or may compute the associated RD cost ($RD_{orig}$). The encoder may apply an ALF (e.g., perform an ALF process) for the specified skip percentage 'A'. Applying an ALF for the specified skip percentage 'A' may include computing the threshold $T_G$ and/or performing pixel-adaptive ALF skip. The encoder may compute the associated RD cost ($RD_{skipA}$). A bias factor β may be determined (e.g., chosen) with a value greater than or equal to one. Bias factor β may be used enable more frames to be processed (e.g., encoded or decoded) with pixel-adaptive ALF skip than if the bias factor is not used.

The bias factor β may be multiplied with $RD_{orig}$. The product of multiplying bias factor β with $RD_{orig}$ may be compared with the associated RD cost $RD_{skipA}$. If the product is the same or smaller than the associated RD cost $RD_{skipA}$, the alf_skip_flag may have a value of zero in the bitstream, indicating ALF is to be applied to the current frame. If the product β×$RD_{orig}$ is greater than $RD_{skipA}$, the encoder may test for skip percentage 'B' and/or compute the associated RD cost ($RD_{skipB}$). If the product β×$RD_{orig}$ is greater than $RD_{skip}$, the alf_skip_flag may have a value of one, indicating pixel-adaptive ALF skip may be performed using a threshold associated with skip percentage B. The threshold associated with 'B' may be signaled. If the product β×$RD_{orig}$ is equal to or the same as $RD_{skipB}$, all_skip_flag may have a value of one, indicating pixel-adaptive ALF skip may be performed using a threshold associated with skip percentage A. The threshold associated with 'A' may be signaled.

Figure 13:
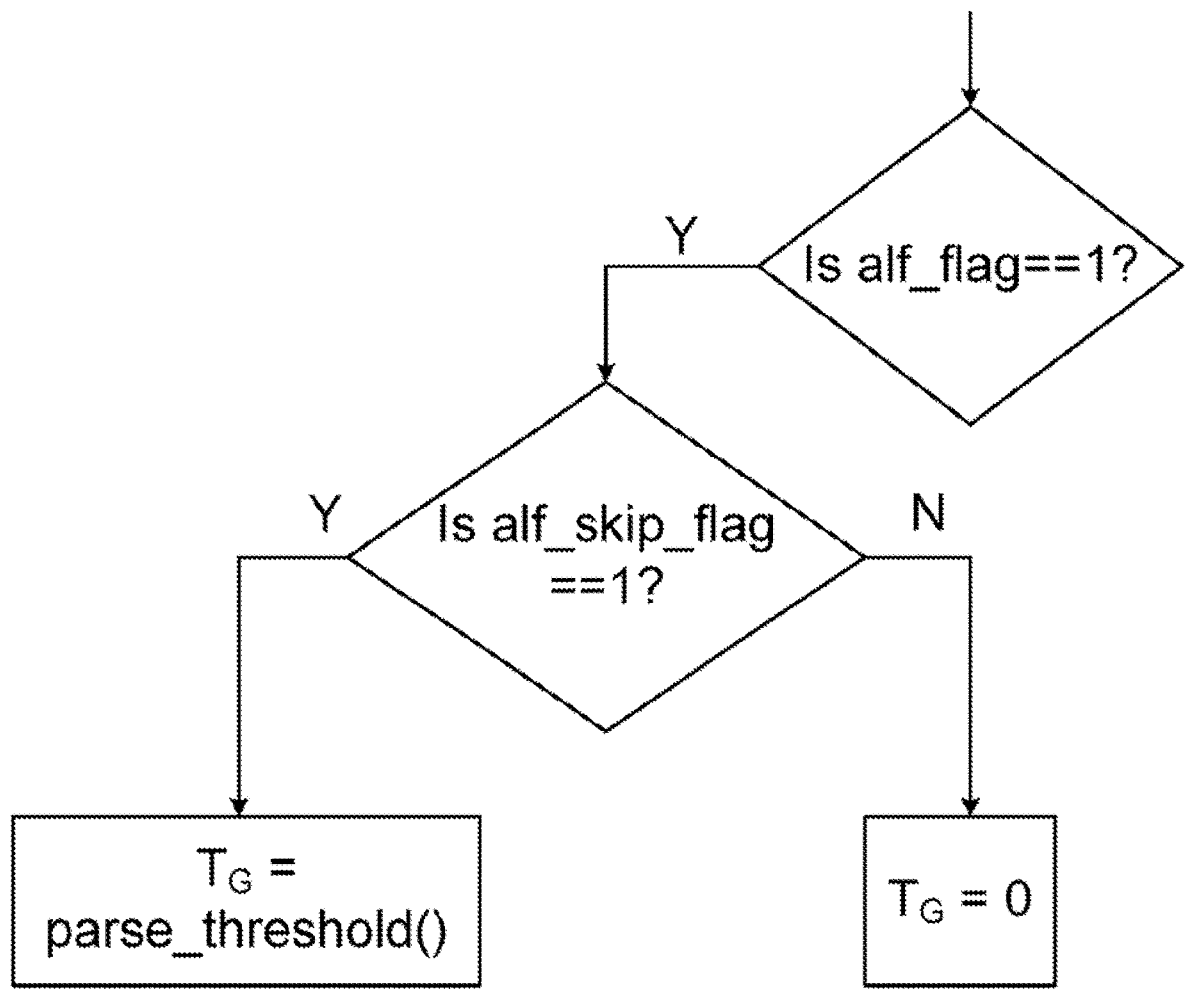
FIG. 13 shows an example of parsing parameters associated with pixel-adaptive ALF skip.

Parameters associated with pixel-adaptive ALF skip may be parsed, for example, at the decoder. FIG. 13 shows an example of parsing the parameters associated with pixel-adaptive ALF skip at the decoder. As shown in FIG. 13, the decoder may parse the bitstream to read the parameters associated with ALF. If ALF is enabled for a given frame (e.g., when alf_flag has a value of one), the bitstream may be parsed to read the alf_skip_flag. The alf_skip_flag having a value of one may indicate that pixel-adaptive ALF skip may be applied to the current frame. If alf_skip_flag has a value of one, the threshold $T_G$ may be parsed from the bitstream and/or used for an ALF skip decision. If this flag is not equal to one, ALF may be applied to the current frame and/or the threshold $T_G$ may be set to a default value (e.g., zero).

The decoder may derive the threshold(s) (e.g., using the approach herein) if and/or when multiple skip percentages are specified at the encoder. The encoder may signal some (e.g., all) of the candidate skip percentages, for example, once per video sequence. If and/or when the pixel-adaptive ALF skip is chosen for a frame, the encoder may signal an index corresponding to the chosen skip percentage. The decoder may derive the threshold(s) based on the candidate skip percentages and an index corresponding to the chosen skip percentage.

ALF ter tap selection may be based on a temporal layer. 5×5, 7×7, and 9×9 ALF may be used for luma components of a frame. 5×5 ALF may be used for two chroma components. In coding schemes using temporal layers, frames at higher temporal layers may be assigned larger QPs than frames at lower temporal layers. Frames at higher temporal layers may be smoother than frames at lower temporal layers. For higher temporal layers, ALFs of small sizes may be used. In an example, the size of ALF used for a frame may be restricted based on which temporal layer in a coding scheme the frame is in. For example, frames in higher temporal layers may be restricted to use filters of small sizes. In an example, in a random access configuration where five temporal layers are used, frames in the fourth temporal layer may be restricted to use 5×5 ALF (e.g., 5×5 ALF only). Frames in the second and third layers may be restricted to use 5×5 and/or 7×7 ALF. Frames in the remaining two lower layers may use any of the three filter sizes.

Block level ALF that reduces computational complexity may be provided. A block-level ALF may be generated. An encoder may compare SSD for filtered and unfiltered blocks. The encoder may decide whether to enable or disable ALF for a given block. SSD may be calculated between a reconstructed block and the original block. A bias in the SSD comparison may be used to favor disabling ALF for a block. Using the bias in the SSD comparison may result in fewer blocks to be filtered at the decoder. A bias factor $\gamma$ may be multiplied with the SSD of the filtered block (Filt_SSD). The bias factor $\gamma$ may have a value that is greater than one. If the product of the bias factor $\gamma$ multiplied with the SSD of the filtered block Filt_SSD is greater than the SSD of the unfiltered block, ALF may be disabled for the block.

The computational complexity of ALF may be reduced by combining one or more approaches described herein. In an example, block classification that reduces computational complexity and/or filtering that reduces computational complexity may be combined. For example, for frames in the highest temporal layer, vertical subsampling may be used during gradient calculation, and pixel-adaptive ALF skip may be used during filtering.

Figure 14A:
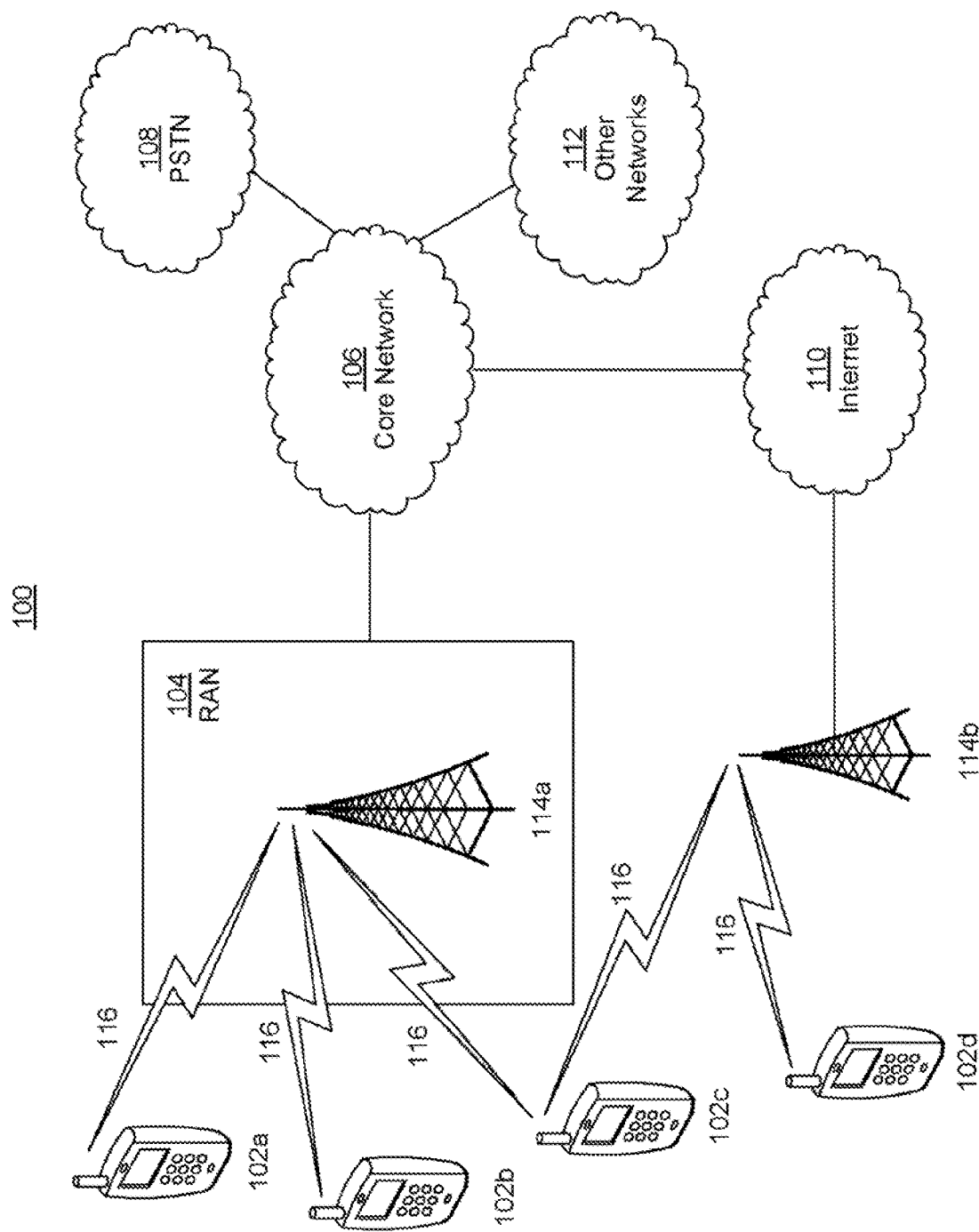
FIG. 14A is a system diagram illustrating an example communications system in which one or more disclosed embodiments may be implemented.

FIG. 14A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 14A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b. 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114 may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication ink (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b. 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 14A may be a wireless router, Home Node B, Home eNode B. or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 14A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 14A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 14A may be configured to communicate with the base station 114a, which may employ a cellular-based radio technology, and with the base station 114b, which may employ an IEEE 802 radio technology.

Figure 14B:
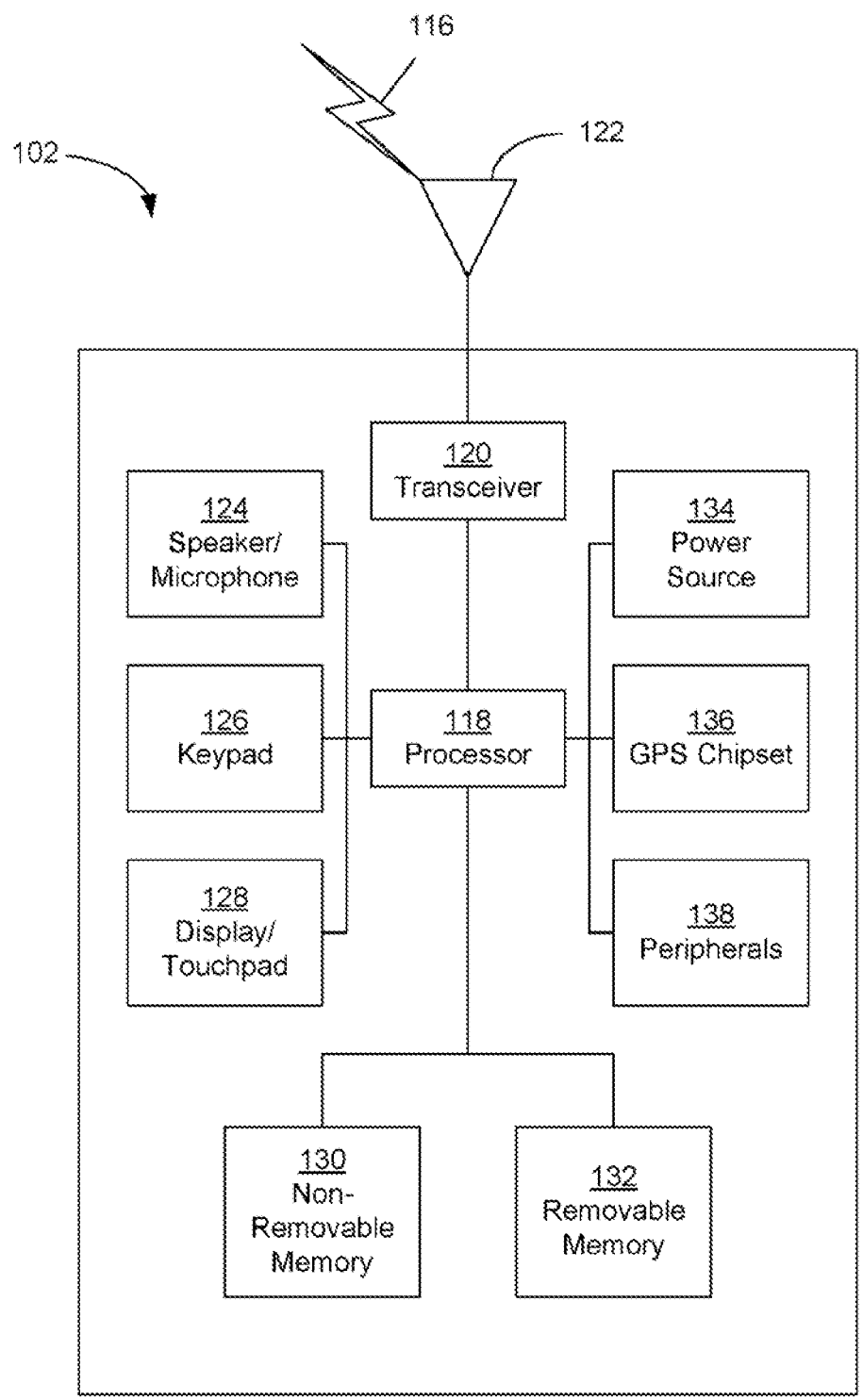
FIG. 14B is a system diagram illustrating an example wireless transmit/receive unit (WTRU) that may be used within the communications system illustrated in FIG. 14A.

FIG. 14B is a system diagram illustrating an example WTRU 102. As shown in FIG. 14B: the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 14B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/a receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 14B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), reed-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in leu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 14C:
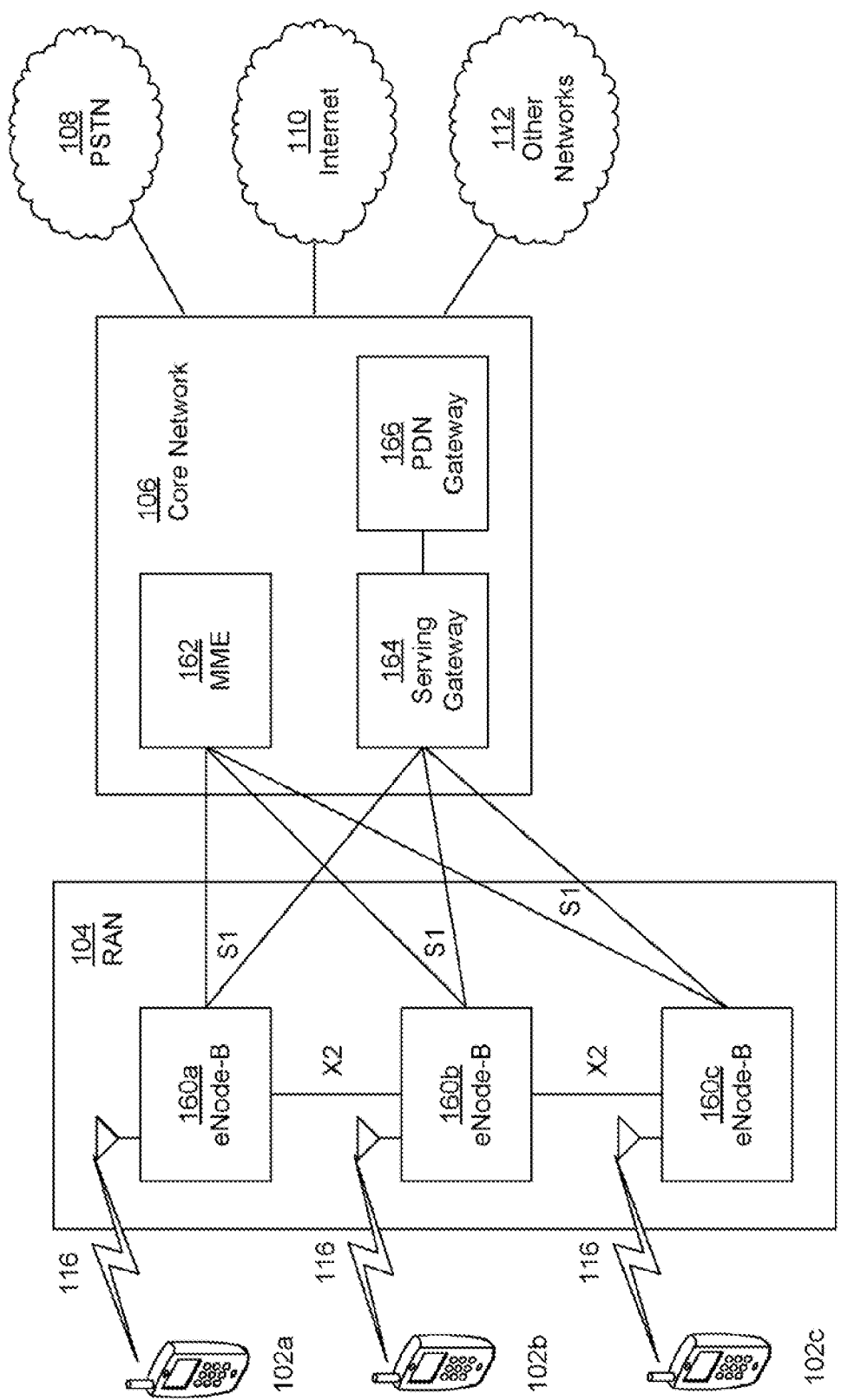
FIG. 14C is a system diagram illustrating an example radio access network (RAN) and an example core network (CN) that may be used within the communications system illustrated in FIG. 14A.

FIG. 14C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160s, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 14C, the eNode-Bs 160a, 160b, 160c may communicate with one another over an X2 interface.

The CN 106 shown in FIG. 14C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a. 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 14A-14D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STA& within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11 tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any oven time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11 af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain aid/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 14D:
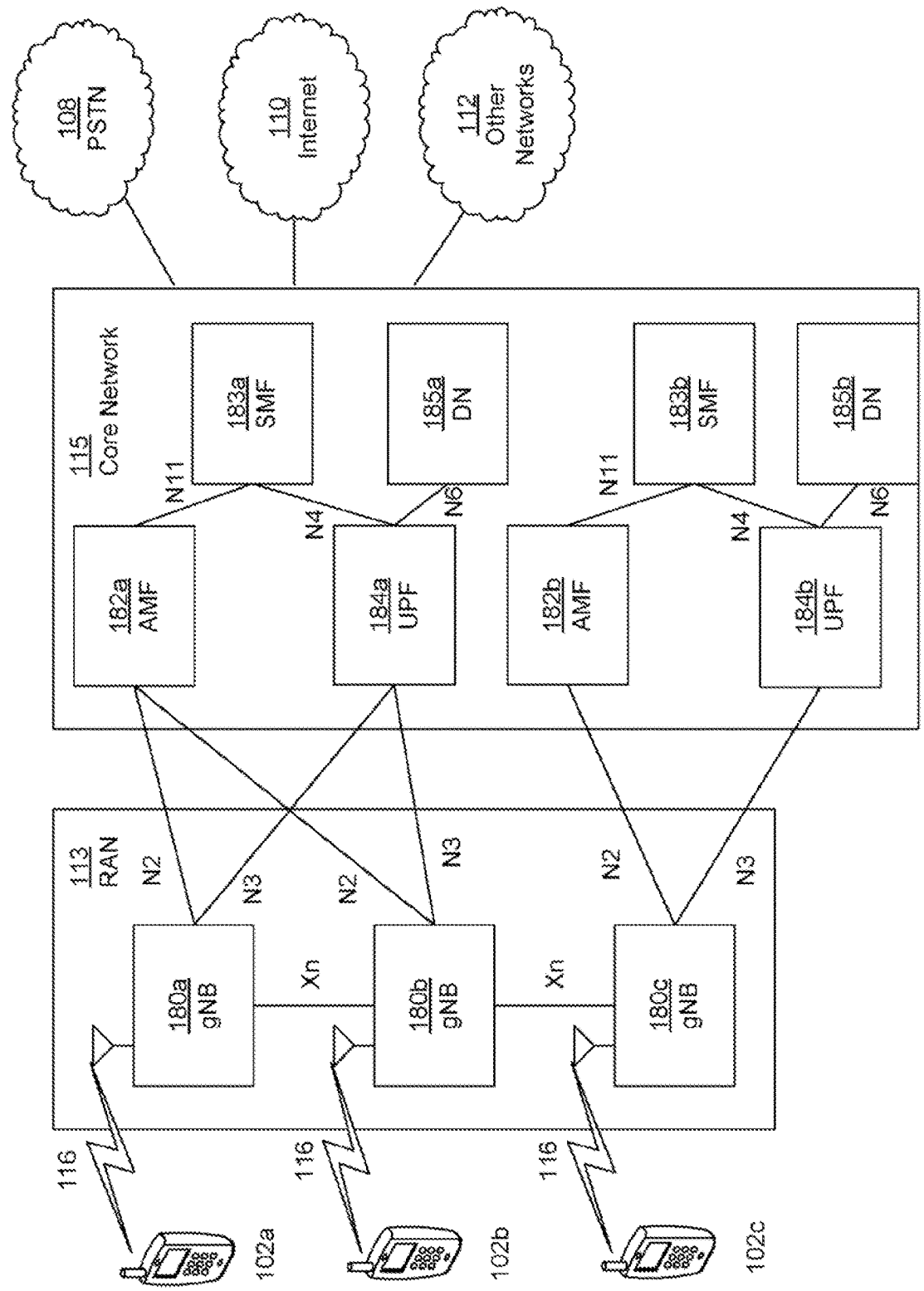
FIG. 14D is a system diagram illustrating a further example RAN and a further example CN that may be used within the communications system illustrated in FIG. 14A.

FIG. 14D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 18b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180 using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In anon-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 180a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular ell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 14D, the gNBs 180a, 180b, 180c may communicate with one another over an Xn interface.

The CN 115 shown in FIG. 14D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 14A-14D, and their corresponding description, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A video decoding device, comprising:
a processor configured to:
select, from a plurality of pixels, a subset of pixels of a video block;
determine a first diagonal variation using a first pixel of the subset of pixels and a second pixel of the subset of pixels, wherein the second pixel is positioned in a first diagonal direction from the first pixel;
obtain a sum of diagonal variations, wherein the sum of diagonal variations is a first sum of diagonal variations and is obtained based on the first diagonal variation;
determine a diagonal gradient based on the sum of diagonal variations;
determine a second diagonal variation using a third pixel of the subset of pixels and a fourth pixel of the subset of pixels, wherein the fourth pixel is positioned in a second diagonal direction from the third pixel;
obtain a second sum of diagonal variations using the second diagonal variation;
perform adaptive loop filtering (ALF) on the video block based on the diagonal gradient and the second sum of diagonal variations; and
decode a picture comprising the video block.

2. The video decoding device of claim 1, wherein, for the selection of the subset of pixels of the video block, a pixel of the plurality of pixels is skipped in a diagonal direction.

3. The video decoding device of claim 1, wherein the performance of ALF on the video block comprises classification of the video block, and wherein the classification of the video block is based on the diagonal gradient.

4. The video decoding device of claim 1, wherein the diagonal gradient is a first diagonal gradient associated with a first diagonal direction, and the processor is further configured to determine a second diagonal gradient associated with a second diagonal direction, and wherein the ALF is performed on the video block further based on the second diagonal gradient.

5. The video decoding device of claim 1, wherein the first pixel and the third pixel are the same, and the second pixel and the fourth pixel are different.

6. The video decoding device of claim 1, wherein, for the selection of the subset of pixels, a pixel is skipped in a vertical direction, and a pixel is skipped in a horizontal direction.

7. The video decoding device of claim 1, wherein the processor is further configured to determine, using the subset of pixels, a horizontal gradient and a vertical gradient, wherein the ALF is performed further based on the horizontal gradient and the vertical gradient.

8. A video decoding method, comprising:
selecting, from a plurality of pixels, a subset of pixels of a video block;
determining a first diagonal variation using a first pixel of the subset of pixels and a second pixel of the subset of pixels, wherein the second pixel is positioned in a first diagonal direction from the first pixel;
obtaining a sum of diagonal variations, wherein the sum of diagonal variations is a first sum of diagonal variations and is obtained based on the first diagonal variation;
determining a diagonal gradient based on the sum of diagonal variations;
determining a second diagonal variation using a third pixel of the subset of pixels and a fourth pixel of the subset of pixels, wherein the fourth pixel is positioned in a second diagonal direction from the third pixel;
obtaining a second sum of diagonal variations using the second diagonal variation;
performing adaptive loop filtering (ALF) on the video block based on the diagonal gradient and the second sum of diagonal variations; and
decoding a picture comprising the video block.

9. The video decoding method of claim 8, wherein the selection of the subset of pixels of the video block comprises skipping a pixel of the plurality of pixels in a diagonal direction.

10. The video decoding method of claim 8, wherein the performance of ALF on the video block comprises classification of the video block, and wherein the classification of the video block is based on the diagonal gradient.

11. A video encoding device, comprising:
a processor configured to:
select, from a plurality of pixels, a subset of pixels of a video block;
determine a first diagonal variation using a first pixel of the subset of pixels and a second pixel of the subset of pixels, wherein the second pixel is positioned in a first diagonal direction from the first pixel;
obtain a sum of diagonal variations, wherein the sum of diagonal variations is a first sum of diagonal variations and is obtained based on the first diagonal variation;
determine a diagonal gradient based on the sum of diagonal variations;
determine a second diagonal variation using a third pixel of the subset of pixels and a fourth pixel of the subset of pixels, wherein the fourth pixel is positioned in a second diagonal direction from the third pixel;
obtain a second sum of diagonal variations using the second diagonal variation;
perform adaptive loop filtering (ALF) on the video block based on the diagonal gradient and the second sum of diagonal variations; and
encode a picture comprising the video block.

12. The video encoding device of claim 11, wherein the processor is further configured to:
determine a first error associated with the picture;
determine a second error based on ALF associated with the picture;
compare the first error and the second error using a bias factor; and
include, based on the comparison, an ALF indication in video data to indicate an ALF utilization status associated with the picture.

13. The video encoding device of claim 11, wherein, for the selection of the subset of pixels of the video block, a pixel of the plurality of pixels is skipped in a diagonal direction.

14. A video encoding method, comprising:
selecting, from a plurality of pixels, a subset of pixels of a video block;
determining a first diagonal variation using a first pixel of the subset of pixels and a second pixel of the subset of pixels, wherein the second pixel is positioned in a first diagonal direction from the first pixel;
obtaining a sum of diagonal variations, wherein the sum of diagonal variations is a first sum of diagonal variations and is obtained based on the first diagonal variation;
determining a diagonal gradient based on the sum of diagonal variations;
determining a second diagonal variation using a third pixel of the subset of pixels and a fourth pixel of the subset of pixels, wherein the fourth pixel is positioned in a second diagonal direction from the third pixel;
obtaining a second sum of diagonal variations using the second diagonal variation;
performing adaptive loop filtering (ALF) on the video block based on the diagonal gradient and the second sum of diagonal variations; and
encoding a picture comprising the video block.

15. The video encoding method of claim 14, wherein the method further comprises:
determining a first error associated with the picture;
determining a second error based on ALF associated with the picture;
comparing the first error and the second error using a bias factor; and
including, based on the comparison, an ALF indication in video data to indicate an ALF utilization status associated with the picture.

16. The video encoding method of claim 14, wherein the diagonal gradient is a first diagonal gradient associated with a first diagonal direction, and the method further comprises determining a second diagonal gradient associated with a second diagonal direction, and wherein the ALF is performed on the video block further based on the second diagonal gradient.

* * * * *